(12) United States Patent
Miller et al.

(10) Patent No.: US 7,298,739 B1
(45) Date of Patent: Nov. 20, 2007

(54) SYSTEM AND METHOD FOR COMMUNICATING SWITCH FABRIC CONTROL INFORMATION

(75) Inventors: Kirk Alvin Miller, San Diego, CA (US); Philip Michael Clovis, San Diego, CA (US); John David Huber, San Diego, CA (US); Kenneth Yi Yun, San Diego, CA (US); Peter John Holzer, Fallbrook, CA (US); John Calvin Leung, San Diego, CA (US)

(73) Assignee: Applied Micro Circuits Corporation, San Diego, CA (US)

( * ) Notice: Subject to any disclaimer, the term of this patent is extended or adjusted under 35 U.S.C. 154(b) by 1089 days.

(21) Appl. No.: 10/378,403

(22) Filed: Mar. 3, 2003

Related U.S. Application Data

(63) Continuation-in-part of application No. 10/035,835, filed on Dec. 24, 2001, now Pat. No. 7,020,131, and a continuation-in-part of application No. 10/029,581, filed on Dec. 20, 2001, and a continuation-in-part of application No. 10/022,673, filed on Dec. 17, 2001, now Pat. No. 7,079,545, and a continuation-in-part of application No. 10/023,266, filed on Dec. 14, 2001, now abandoned.

(51) Int. Cl.
*H04L 12/50* (2006.01)
(52) U.S. Cl. .................. 370/373; 370/225; 370/244; 370/461
(58) Field of Classification Search ............ 370/411, 370/362–365, 447, 461, 462, 463, 535, 216, 370/225, 241, 242, 244, 369, 373, 449; 710/113; 712/15
See application file for complete search history.

(56) References Cited

U.S. PATENT DOCUMENTS

| | | | | |
|---|---|---|---|---|
| 5,781,745 A | * | 7/1998 | Ramelson et al. | 710/113 |
| 6,343,081 B1 | * | 1/2002 | Blanc et al. | 370/411 |
| 2004/0030859 A1 | * | 2/2004 | Doerr et al. | 712/15 |

* cited by examiner

*Primary Examiner*—John Pezzlo
(74) *Attorney, Agent, or Firm*—Law Office of Gerald Maliszewski; Gerald Maliszewski

(57) ABSTRACT

A system and method are provided for communicating control information in a switch fabric. The method comprises: on a switch card, establishing a plurality of crossbars controlled by an arbiter; initiating a control message; and, distributing the control message on a switch card token bus connecting the crossbars and arbiter elements. Distributing the control message on a switch card token bus connecting the crossbar and arbiter elements includes daisy-chain connecting the elements with a cyclical bus. In some aspects of the method, establishing a plurality of crossbars controlled by an arbiter includes identifying each element with a unique address. Then, initiating a control message includes initiating a control message with an attached address. Distributing the control message on a switch card token bus includes the substeps of: daisy-chain passing the control message between elements; and, terminating the message at an element having an address matching the address attached to the control message.

40 Claims, 14 Drawing Sheets

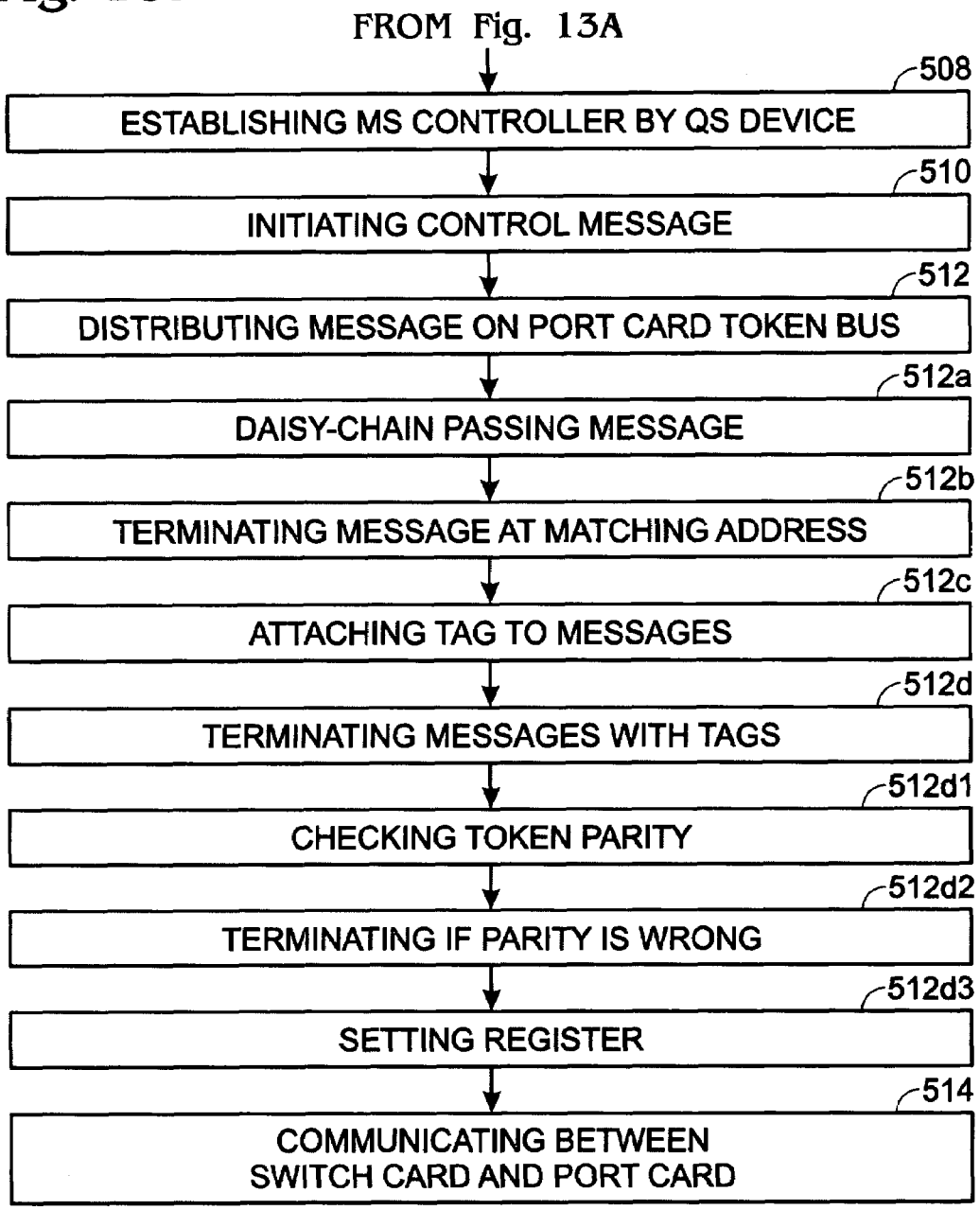

Fig. 14 *(PRIOR ART)*
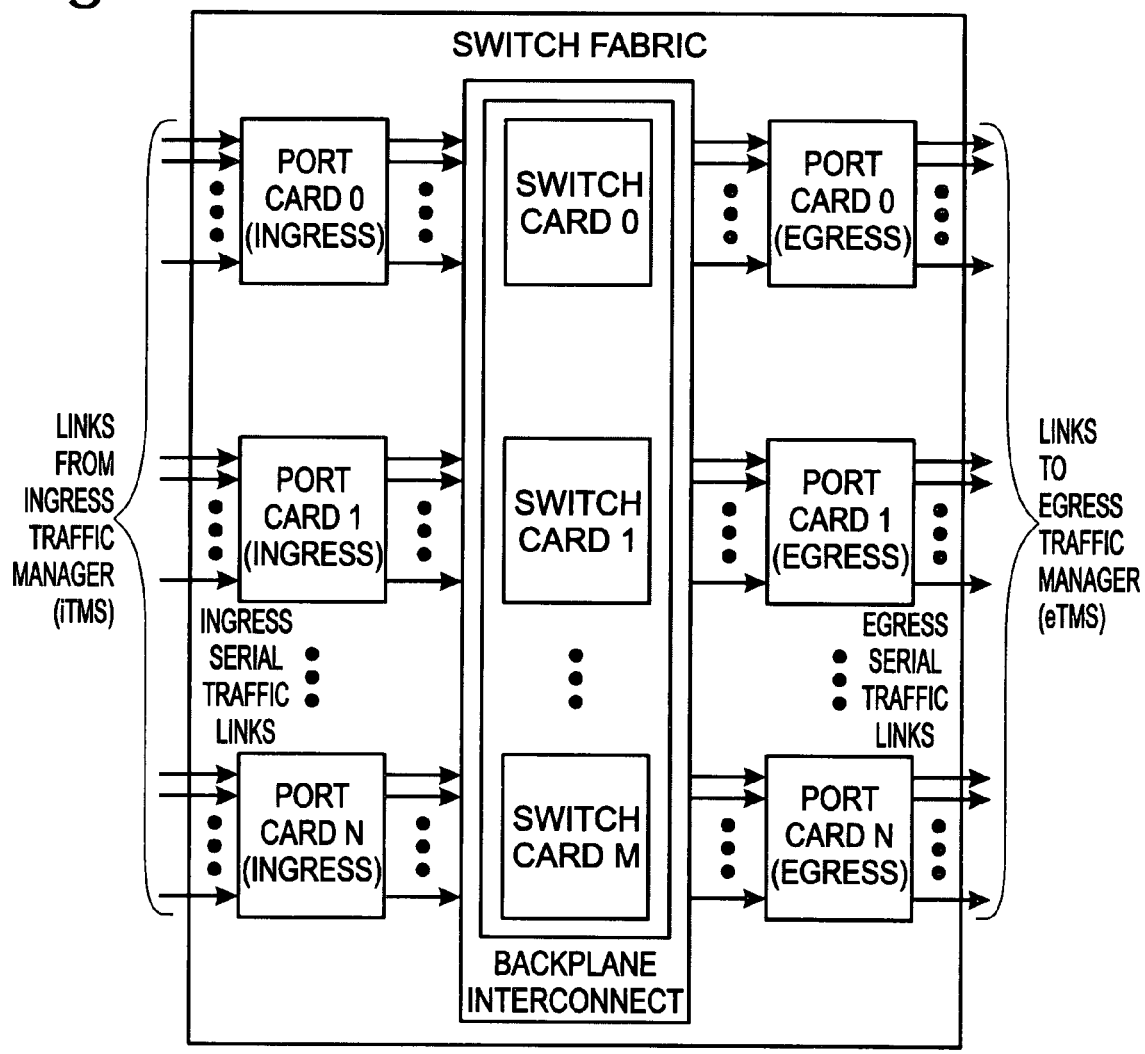

SYSTEM AND METHOD FOR COMMUNICATING SWITCH FABRIC CONTROL INFORMATION

RELATED APPLICATIONS

This application is a continuation-in-part of a application entitled, SYSTEM AND METHOD FOR SWITCHING VARIABLY SIZED INFORMATION GROUPS, invented by Yun et al., Ser. No. 10/023,266, filed Dec. 14, 2001 now abandoned.

This application is a continuation-in-part of a application entitled, SYSTEM AND METHOD FOR SIMULTANEOUS DEFICIT ROUND ROBIN PRIORITIZATION, invented by Yun et al., Ser. No. 10/022,673, filed Dec. 17, 2001 now U.S. Pat. No. 7,079,545.

This application is a continuation-in-part of a pending application entitled, SYSTEM AND METHOD FOR GRANTING ARBITRATED BIDS IN THE SWITCHING OF INFORMATION, invented by Yun et al., Ser. No. 10/029,581, filed Dec. 20, 2001.

This application is a continuation-in-part of a application entitled, SYSTEM AND METHOD FOR HIERARCHIAL SWITCHING, invented by Yun et al., Ser. No. 10/035,835, filed Dec. 24, 2001 now U.S. Pat. No. 7,020,131.

BACKGROUND OF THE INVENTION

1. Field of the Invention

This invention generally relates to packet communications switching and, more particularly, to a system of method of communicating control messages in a switch fabric.

2. Description of the Related Art

There is industry demand for integrated circuits (ICs) switching systems that can be easily scaled for Network Access, the Network Edge, or a Core Switch Router, at the high end. SCSA (Signal Computing System Architecture) defines a switch fabric to be the facility for connecting any two (or more) transmitting or receiving Service Providers.

FIG. 14 is a schematic block diagram of a general switch fabric system (prior art). Traffic enters the system on the ingress side (the left side of the figure). Traffic exits the system on the egress side (the right side of the figure). The port card ingress and egress structures are sometimes subdivided into channels and subchannels. The packet headers specify a required destination port card, channel, and subchannel. The system must synchronously route each ingress packet to the correct egress destination.

Packets are converted into frames by ingress traffic managers (iTMs). A frame is a logical unit of data, which is often a small piece of a much larger data set such as a file or image. The iTMs feed the ingress side of the fabric. The switch fabric might convert the frame format to a "native" format, and then on egress, convert the data back into the TM frame format before sending the data to the egress traffic managers (eTMs). If the frames are fixed size (for example: 53 bytes, 64 bytes, or 80 bytes), the frames are often called cells.

Protocol Specific vs. Protocol Agnostic

A switch fabric can be protocol specific or protocol agnostic. An example of a protocol specific switch fabric would be a system designed and optimized specifically for asynchronous transfer mode (ATM) traffic. Another example would be a switch that handles only TCP/IP traffic. The obvious disadvantage of a switch fabric hardwired to handle a specific protocol is lack of flexibility. Service providers want to sell services to a variety of customers in various industries. Protocols vary from industry to industry.

Even within one protocol type, there can be protocol upgrades. For example, TCP/IP, the machine language of Internet routers, now runs primarily "IPv4." This protocol, successful as it has been, has a lack of available addresses, poor security features, and no "quality of service" (QoS) provisions. The next generation Internet protocol is "IPv6." It provides solutions to these limitations.

A protocol agnostic switch fabric works equally well with all protocol types, however, the traffic manager must be responsible for recognizing specific protocol types. The disadvantage of a protocol agnostic switch fabric is that it may be more complicated, and perhaps slower than a switch fabric dedicated to a particular protocol.

Packet Striping vs. Single Link Per Packet

The simplest way for a traffic manager to transmit a packet into a switch fabric is to transmit the packet serially along one line. Striping is a way of achieving higher bandwidth by transmitting a single packet across multiple ingress/egress lines. For example, a TM can transmit a packet into a switch fabric eight times as fast if the packet is sliced into eight pieces (stripes) by the TM, and conveyed into the fabric along 8 parallel lines simultaneously. The fabric captures the packet in memory, routes it to the required egress destination, and slices the packet into 8 parallel lines before transmitting the packet to the egress TM.

The upside to packet striping is the potential for lower latency. There are several negative aspects of packet striping:

if one of the links is damaged (1 of 8 in the example above), the entire channel is out of service, degrading fault tolerance; and, the interface between the TM and switch fabric is more complicated. Circuitry must be used to slice the packet into stripes and reassemble it into packets.

Single-Cell Packet vs. Multi-Cell Packets

Many switch fabrics now deployed and passing revenue traffic, especially in wide area networks (WANs), use asynchronous transfer mode (ATM) packets. ATM packets are single-cell packets, with a fixed cell size of 53 bytes, 48 bytes of which is the information payload. The ATM specification evolved in the 1980s and early 1990s. It was then believed that variable length (multi-cell) packets would be too difficult to implement at rates needed for wire-speed traffic. The single-cell solution was a compromise that would work for voice data, video data, multimedia data, email data, file data, etc. With a fixed frame size, switch designs are simplified and ultimately faster.

However, files are better sent in large frames. Voice switching performs better with small bursts of data, corresponding to analog-to-digital converter time slots. Large frames and concomitant switching latencies can render a switch useless for most 2-way voice applications. Voice communications require low latency (time delay). Since ATM had to work for all network data, the small payload (voice) requirements prevailed at the expense of the large frame applications.

For large frames or packets it is much more efficient to establish a path from an ingress port card to the required egress destination, and then leave this path undisturbed until the packet is completed. With single cell packets, the ingress port card must bid for, accept grants, and then schedule each cell of a multi-cell packet.

There are also Frame Relay switch fabrics. Frame Relay is a single-cell protocol, albeit with frame size ranging from 6 to 4096 bytes. Such switch fabrics have been deployed and passing revenue traffic since the early 1990s. These switch fabrics have generally not been used for voice data because of the large latency. Only highly compressed voice traffic works well over frame relay. Voice-over-frame relay was added as an afterthought by network engineers. Frame relay excels at data communications such as local area network internetworking (LAN-to-LAN). Such communications are very high speed and bursty, with non-critical latency constraints.

Cut-Through vs. Store-and-Forward

The conventional method of switch fabric packet routing is called Store-and-Forward. In this method, the switch fabric accepts an input packet and buffers the packet on the ingress side of the fabric, making sure the packet was received intact, knowing the exact number of cells in the packet. The problem with the store-and-forward method is the added latency of buffering the packet. In Cut-through Packet Routing (CPR), a switch fabric is able to send the incoming packet cells to the correct egress port as soon as the destination address is known.

Memory-Based vs. Arbitrated Crossbar

A switch fabric can use memory-based crossbars or arbitrated crossbars. A memory-based crossbar is sometimes called a "shared memory switch." Ingress packets flow from the port cards into a huge memory bank, which serve as the switch. From the memory bank, the destination address is determined from egress port destination information in the cell headers. The problem with these switch fabrics is that they become prohibitively expensive and large from all the required high-speed memory. Such fabrics cannot be used to reach terabit total switching speeds with technology available today.

It would be advantageous if a switch fabric could use arbitrated crossbars to reduce the need for high-speed memory.

It would be advantageous if a switch fabric could use Cut-though packet routing to reduce latency.

It would be advantageous if a switch fabric could handle multi-cell packets, so as to switch larger-sized packets with a reduced latency.

It would be advantageous if a switch fabric could use a single-link for each packet, to improve the system fault tolerance and simplify the interface to a TM.

It would be advantageous if the above-mentioned switch fabric could operate protocol agnostic.

It would be advantageous if switch fabric elements could communicate diagnostic and configuration information without dedicated wiring.

It would be advantageous if a microprocessor located in each switch fabric switch card could be used to configure, monitor the status of, and diagnose switch card problems.

It would be advantageous if a microprocessor located in each switch fabric switch card could be used to configure, monitor the status of, and diagnose problems on port cards connected to the switch cards.

It would be advantageous if a microprocessor located in each switch fabric switch card could be used to configure, monitor the status of, and diagnose problems on port cards connected to switch cards, using existing switch fabric control links.

SUMMARY OF THE INVENTION

Accordingly, a method is provided for communicating control information in a switch fabric. The method comprises: on a switch card, establishing a plurality of crossbars controlled by an arbiter; initiating a control message; and, distributing the control message on a switch card token bus connecting the crossbars and arbiter elements. Distributing the control message on a switch card token bus connecting the crossbar and arbiter elements includes daisy-chain connecting the elements with a cyclical bus.

In some aspects of the method, establishing a plurality of crossbars controlled by an arbiter includes identifying each element with a unique address. Then, initiating a control message includes initiating a control message with an attached address. Distributing the control message on a switch card token bus includes the substeps of: daisy-chain passing the control message between elements; and, terminating the message at an element having an address matching the address attached to the control message.

The arbiter attaches a switch card tag to transmitted messages being distributed on the token bus, and terminates received messages being distributed on the token bus having switch card tags. The arbiter terminates received messages being distributed on the token bus having switch card tags by: checking the token parity; terminating the control message if the parity is wrong; and, setting a register to indicate that a control message has been terminated in response to a failed parity check.

Port cards also include a token bus that communicates a control message in a manner analogous to the switch card described above. In addition, the method further comprises communicating control messages between the switch card arbiter and the port card queuing/scheduling (QS) device. In some aspects of the method, initiating a control message includes: initiating a control message from a switch card processor; and, transmitting the control message from the processor to the arbiter. The control message may be a request to the arbiter concerning the status of the port card QS device control link, a request to the crossbars concerning the status of interfacing data links, a request to the QS device concerning the status of an MS, a request to port card memory subsystems (MSs) concerning the status of interfacing data links, switch card configuration commands, or port card configuration commands.

Additional details of the above described method and a system for communicating control information in a switch fabric is provided below.

BRIEF DESCRIPTION OF THE DRAWINGS

FIGS. 13a and 13b are flowcharts illustrating the present invention method for communicating control information in a switch fabric.

FIG. 14 is a schematic block diagram of a general switch fabric system (prior art).

DETAILED DESCRIPTION OF THE PREFERRED EMBODIMENTS

Figure 1:
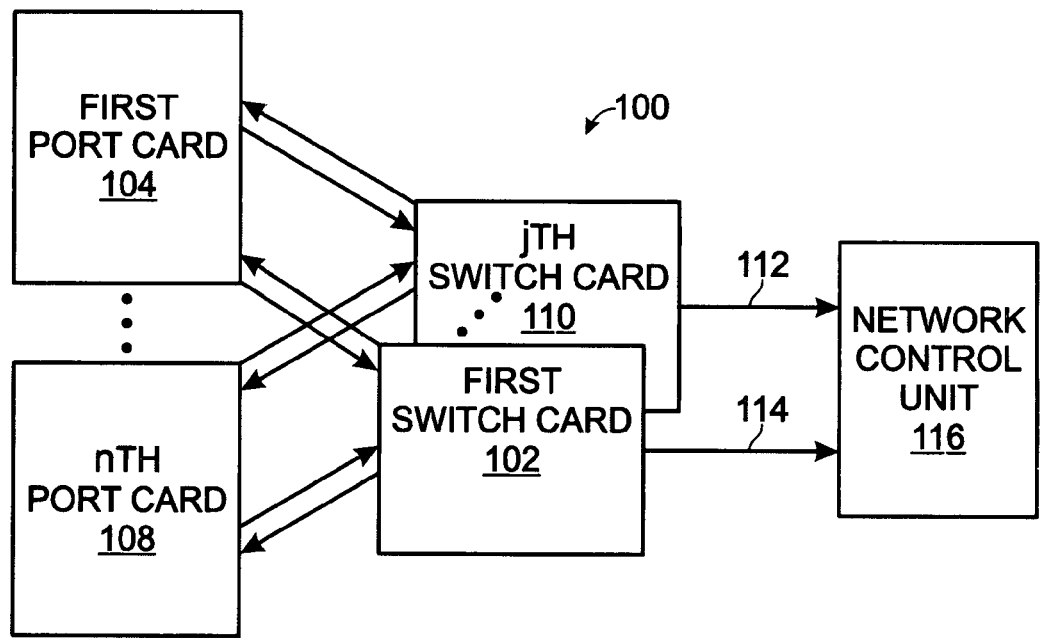
FIG. 1 is a schematic block diagram illustrating the present invention system for communicating control information in a switch fabric.

FIG. 1 is a schematic block diagram illustrating the present invention system for communicating control information in a switch fabric. The system 100 comprises a switch card 102. Although only a single switch card is initially discussed, it should be understood that the system 100 may include a plurality of switch cards.

Figure 2:
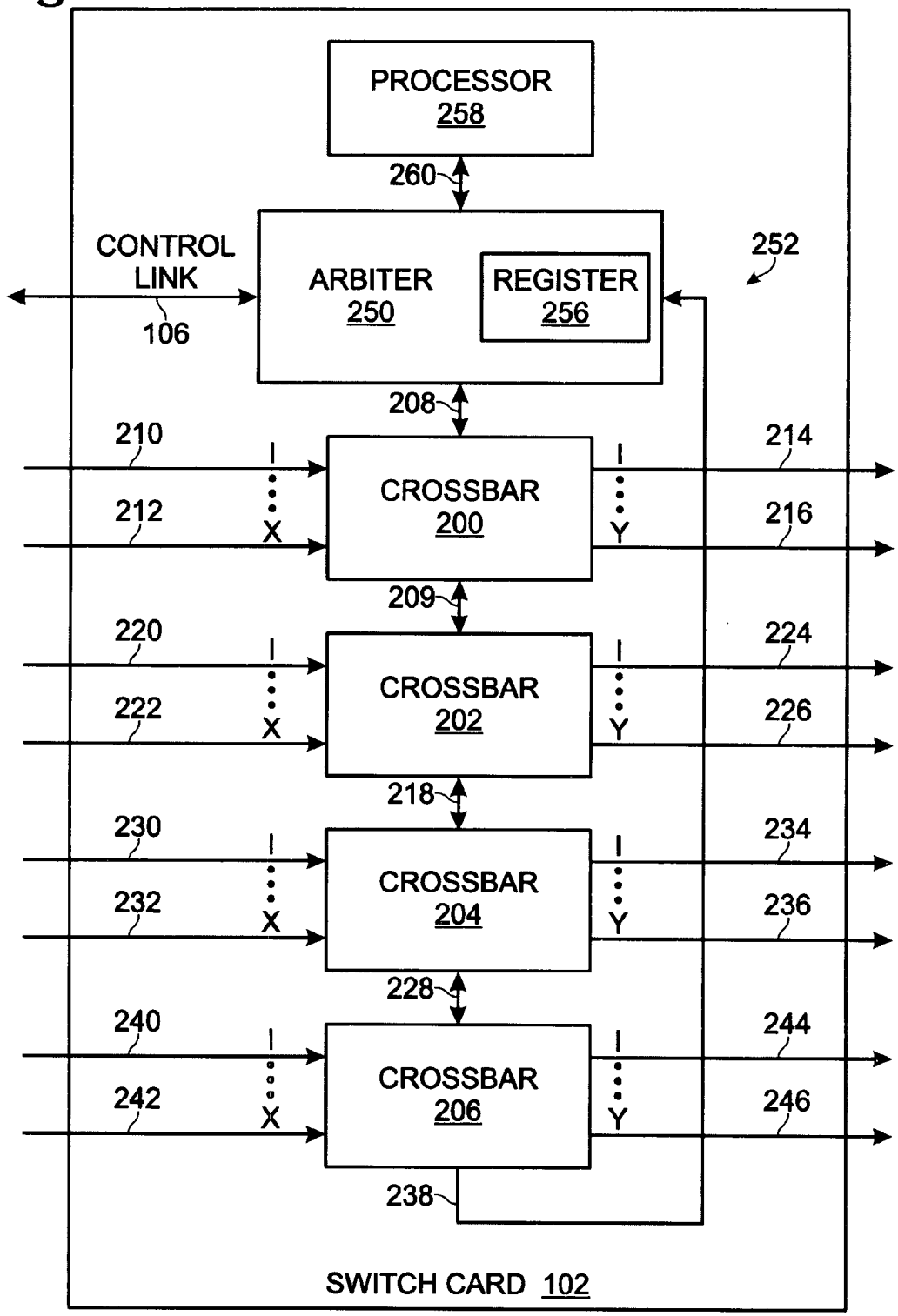
FIG. 2 is a schematic block diagram of the switch card of FIG. 1.

FIG. 2 is a schematic block diagram of the switch card 102 of FIG. 1. The switch card 102 typically includes a plurality of crossbars. Four crossbars 200, 202, 204, and 206, are shown, however, the switch card 102 is not limited to any particular number of crossbars. In some aspects of the system (not shown), the switch card 102 may either include just a single crossbar, or just a single enabled crossbar. Each crossbar has control ports and a plurality of backplane data link interfaces. Crossbar 200 has an ingress control port on line 208, an egress control port on line 209, ingress backplane data links 1 through x, on lines 210 through 212, respectively, and egress backplane data links 1 through y on lines 214 through 216, respectively. The values of x and y are not limited to any particular value.

Likewise, crossbar 202 has an ingress control port on line 209, an egress control port on line 218, ingress backplane data links 1 through x, on lines 220 through 222, respectively, and egress backplane data links 1 through y on lines 224 through 226, respectively. Crossbar 204 has an ingress control port on line 218, an egress control port on line 228, ingress backplane data links 1 through x, on lines 230 through 232, respectively, and egress backplane data links 1 through y on lines 234 through 236, respectively. Crossbar 206 has an ingress control port on line 228, an egress control port on line 238 ingress backplane data links 1 through x, on lines 240 through 242, respectively, and egress backplane data links 1 through y on lines 244 through 246, respectively.

An arbiter 250 has an ingress control port on line 238 and an egress control port on line 208. Taken as a whole, control lines 238, 228, 218, 209, and 208 may be considered a switch card token bus connecting the arbiter and crossbar element control ports for the distribution of control messages. The switch card token bus is given the reference designator 252. Alternately stated, the switch card token bus 252 is a cyclical bus daisy-chain connecting the arbiter and crossbar ingress and egress control ports 208, 209, 218, 228, and 238.

The switch card token bus 252 daisy-chain passes a control message with an address attachment between the arbiter 250 and the crossbar 200, 202, 204, and 206 elements. The arbiter 250 has a unique address. The arbiter 250 reads and terminates any received control message with an attachment matching the arbiter address. As used herein, "terminates" means that the message is not passed onto the next element on the token bus 252. Likewise, each crossbar 200-206 has a unique address. Each crossbar reads and terminates a received control message with an attachment matching its address.

In some aspects of the system, the arbiter 250 attaches a switch card tag to messages being transmitted on the token bus 252. Then, the arbiter 250 terminates messages being received on the token bus 252 having switch card tags. In this manner, the arbiter 250 is able to clear the token bus 252 of faulty and misdirected messages.

More specifically, the arbiter 250 includes a register 256, the arbiter 250 checks the token parity of any received control message and terminates the control message if the parity is wrong. The arbiter 250 sets the register 256 to indicate that a control message has been terminated in response to a failed parity check.

Returning to FIG. 1, the system further comprises a port card 104. Although only a single port card is initially discussed, it should be understood that in other aspects of the system the switch card 102 may be connected to a plurality of port cards.

Figure 3:
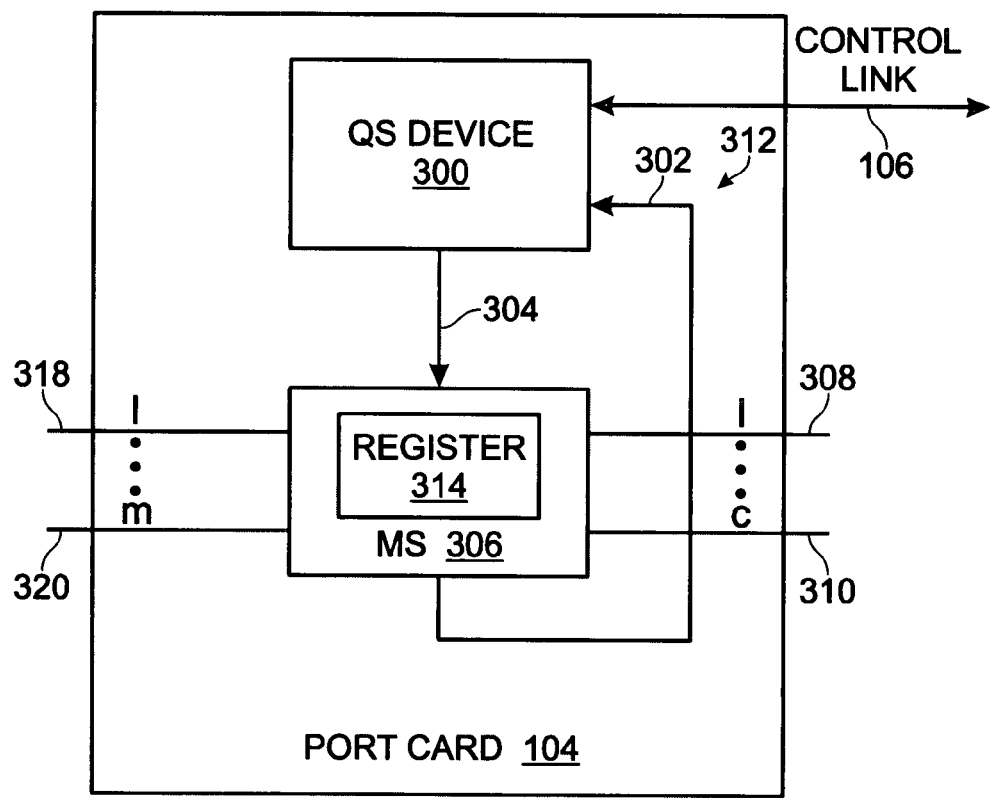
FIG. 3 is a schematic block diagram of the port card of FIG. 1.

FIG. 3 is a schematic block diagram of the port card 104 of FIG. 1. Each port card, as exemplified by port card 104 includes a queuing and scheduling (QS) device 300. The QS device 300 can be a priority queue (PQ), an earliest deadline first queue (EDFQ), or a field programmable gate array (FPGA). The QS device 300 has an ingress control port on line 302 and an egress control port on line 304.

A memory subsystem 306 (MS) has an ingress control port on line 304 and an egress control port on line 302. The MS 306 has backplane data link interfaces 1 through c on lines 308 through 310, respectively, connected to the switch card crossbar backplane data link interfaces (see FIG. 2). Lines 308 and 310 constitute a port card token bus 312 connecting the MS and the QS device ingress and egress control ports for the distribution of control messages. The MS 306 also interfaces to data lines 1 through m connected to port card ports communicating packets on lines 318 through 320, respectively. The values of c and m are not limited to any particular value.

Figure 4:
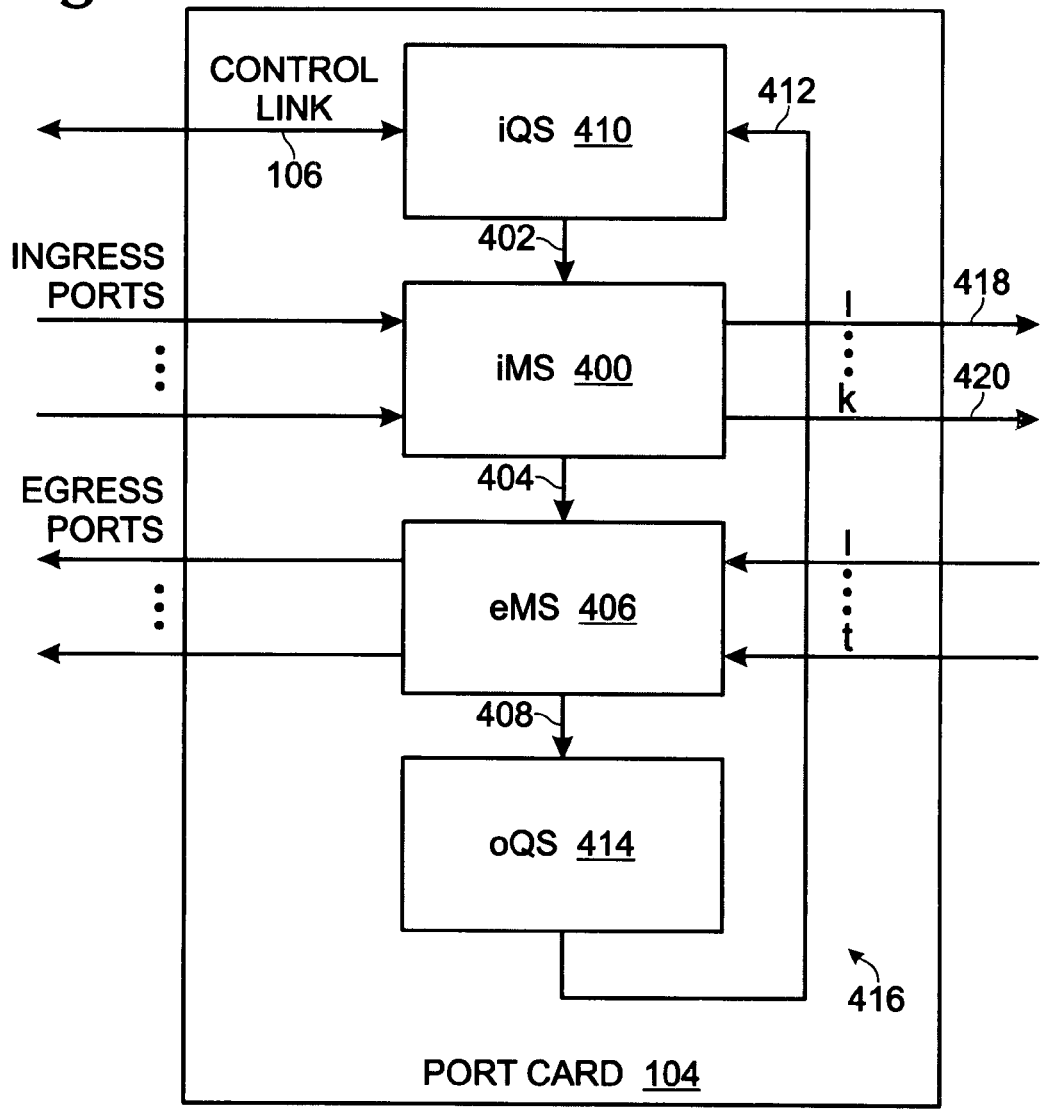
FIG. 4 is a more detailed depiction of the port card of FIG. 3, including both ingress and egress functions.

FIG. 4 is a more detailed depiction of the port card 104 of FIG. 3, including both ingress and egress functions. Then, the MS includes an ingress MS 400 (iMS) with an ingress control port on line 402 and an egress control port line on line 404. An egress MS 406 (eMS) has an ingress control port on line 404 and an egress control port on line 408.

The QS device includes an ingress QS (iQS) device 410, for controlling the iMS 400, with an ingress control port on line 412 and an egress control port on line 402. An egress QS (oQS) device 414 controls the eMS 406. The oQS device 414 has an ingress control port on line 408 and an egress control port on 412. Lines 402, 404, 408, and 412 constitute the port card token bus 416 that daisy-chain connects the iQS device 410, iMS 400, oQS device 414, and eMS 406 element ingress and egress control ports with a cyclical bus.

The iMS 400 is connected through ingress backplane data links 1 through k on lines 418 through 420, respectively, to crossbar ingress backplane data link inputs of the switch card (see FIG. 2). The value of k is not limited to any particular value. The eMS 406 is connected through egress backplane data links 1 through t on lines 422 through 424, respectively to crossbar outputs. The value of t is not limited to any particular value. In other aspects of the invention (not shown), the port card 104 may include a plurality of iMSs, with corresponding iQSs.

For greater simplicity the description of the port card 104 returns to FIG. 3. As with the switch card described above, the port card token bus 312 daisy-chain passes a control message with an address attachment between the QS device 300 and the MS 306. The MS 306 has a unique address. The MS 306 reads and terminates any received control message with an attachment matching the MS address. Likewise, the QS device 300 has a unique address. The QS device 300 reads and terminates a received control message with an attachment matching the queuing device address.

In some aspects, the MS 306 attaches a port card tag to transmitted messages being distributed on the token bus. Then, the MS 306 terminates received messages being distributed on the bus having port card tags. In some aspects of the invention the iMS, or one particular iMS if the port card includes a plurality of iMSs, terminates the messages with port card tags. Alternately, the eMS performs the above-mentioned termination function. The MS 306 may include a register 314. The MS 306 checks the token parity of the received control message and terminates the control message if the parity is wrong. Then, the MS 306 sets the register 314 to indicate that a control message has been terminated in response to a failed parity check. The MS register 314, as well as the arbiter register mentioned above in the description of FIG. 2, can be accessed for diagnostic purposes.

Viewing FIGS. 2 and 3, the switch card arbiter 250 has a control link port connected to the port card QS device on line 106, for communicating control messages. Typically, the control link 106 is used by the port cards to negotiate for crossbar access. In one aspect of the system 100, the arbiter 250 sends a control message to the QS device 300. The QS device 300 passes the control message to the port card token bus 312, and the port card token bus 312 distributes the control message from the arbiter 250.

Referring specifically to FIG. 2, in some aspects the switch card 102 further includes a processor 258 having a port connected to an arbiter processor port on line 260 for initiating control messages. The processor 258 may initiate one of several different kinds of control messages. For example, requests to the arbiter 250 concerning the status of received QS device control links, such as link 106. Other control messages may be requests to a crossbar concerning the status of interfacing data links. For example, the crossbar 200 may be queried on the status or health of ingress backplane data link 1 on line 210.

Requests can also be made to the QS device concerning the QS device and/or the status of received arbiter control links, such as link 106. Requests can be made to MSs, through the QS device 300 concerning MS 306 status (either the iMS or the eMS, see FIG. 4) and the status of received data links, either the port card ingress/egress ports 1 through m associated with lines 318 through 320, or backplane data links 1 through c associated with lines 308 through 310. Other control messages are switch card configuration commands, which may enable backplane data and control links to various ports, and port card configuration commands, which may enable backplane data and control links to various switch cards in the system.

In other aspect, a crossbar may initiate a control message in response to data link interface fault. For example, crossbar 200 may initiate a message in response to a faulty backplane data link 1 on line 210. The switch card token bus 252 passes the control message from the crossbar 200 to the arbiter 250. The arbiter 250 accepts and saves the control message in a memory (not shown). Then, the processor 258 may poll the arbiter 250 for saved control messages.

Considering FIGS. 2 and 3, in other aspects of the system the port card QS device 300 sends a control message to the switch card arbiter 250. In some aspects, the message is relayed to another port card via the switch card arbiter. For example, the oPQ of a first port card may wish to send the status of a packet being transmitted to a second port card iPQ, from which the packet is being sourced.

Returning to FIG. 1, the system 100 is shown with a plurality of port cards. Shown are a first port card 104 through an nth port card 108, where the value of n is not limited to any particular value. As in the description of FIG. 3 above, each port card includes a QS device, a MS, and a port card token bus connecting the MS and the QS device elements for the distribution of control messages.

The system 100 may include a plurality of switch cards. Shown are a first switch card 102 through an jth switch card 110, where the value of j is not limited to any particular value. As in the description of FIG. 2 above, each switch card may include a plurality of crossbars, an arbiter, and a switch card token bus connecting the arbiter and crossbar element control ports for the distribution of control messages. Each switch card may also include a processor. Lines 112 through 114 represent dedicated lines between the switch card processors and a network control unit 116.

The system 100 permits control messages to be passed between a switch card and a plurality of connected port cards. Further, the system permits control communications to occur between switch cards, through a port card to which the switch cards are connected.

Functional Description

The Applied Micro Circuits Corporation (AMCC) S8005 Cyclone™ series is a specific embodiment of the above-described present invention series. The Cyclone series is a highly integrated, low power, area efficient chip set that implements a high-capacity switching fabric that seamlessly handles both packet and TDM (time division multiplexed) traffic. Details of this specific embodiment are presented below to clarify some of the system aspects described above. The switch fabric processes all types of packet traffic (ATM, MPLS, IP, etc.). The system switch fabric is based on a set of four highly integrated ICs which contain SERDES and memory in order to reduce the overall system power, routing complexity, and required board area. The chip set consists of the following chips:

S8505 Priority Queue (PQ);
S8605 Arbiter/Crossbar;
S8805 Earliest Deadline First Queue (EDFQ); and,
S8905 Memory Subsystem (MS).

The port cards described above could be a single device including the PQ, MS, and EDFQ chip functions.

Figure 5:
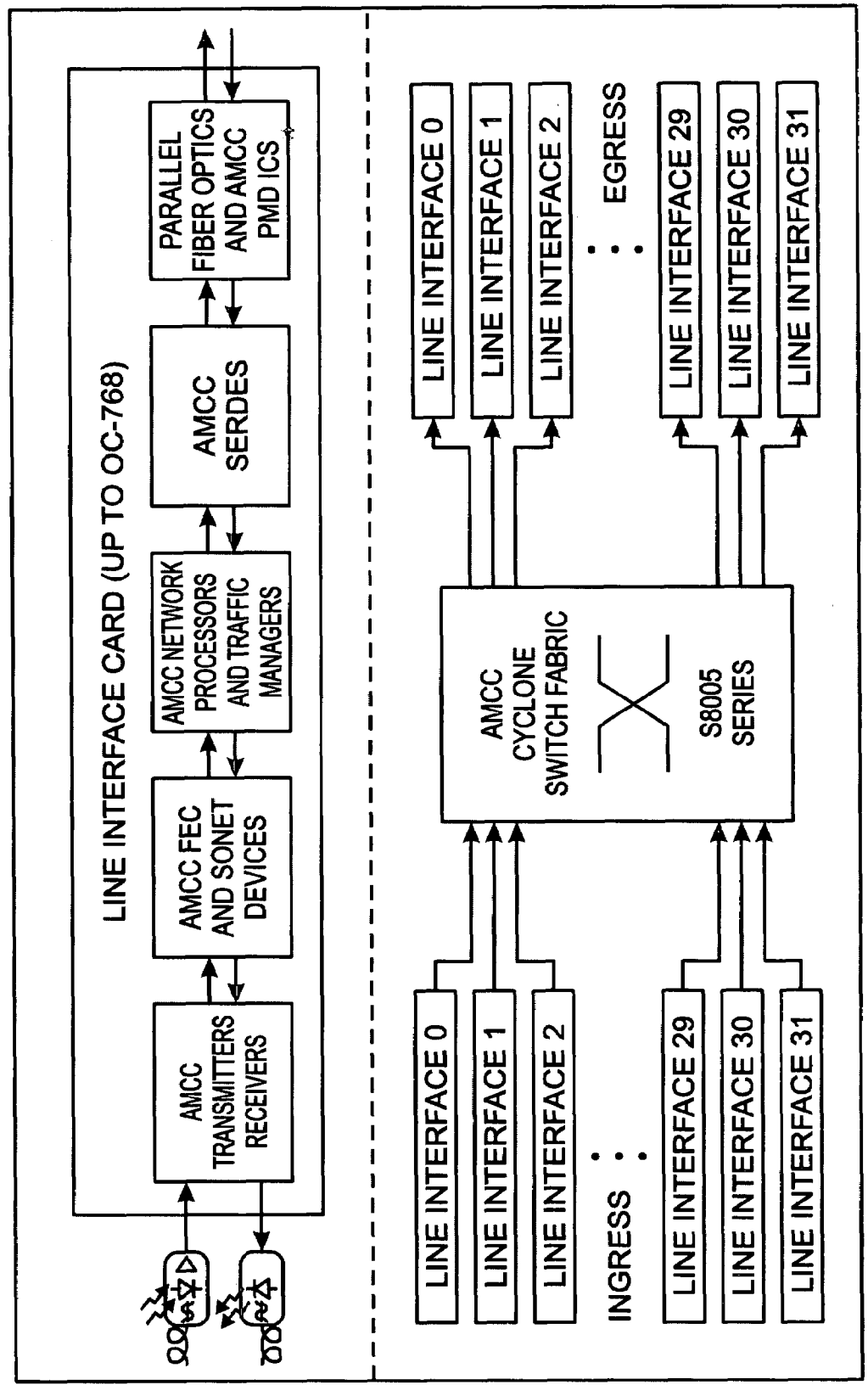
FIG. 5 is a schematic block diagram depicting a packet communications network utilizing the present invention switch fabric.

FIG. 5 is a schematic block diagram depicting a packet communications network utilizing the present invention switch fabric. Traffic management is integrated into the switch fabric and occurs at the ingress, switching, and egress in order to guarantee quality of service (QoS). The switch fabric is scalable and can terminate up to 128 OC-192's (1.28 Tbps). The system can be organized as a 32×32 port switch where each port consists of four OC-192 channels, in effect implementing a 128×128 switch. The OC-192's can be either channelized or concatenated. The fabric can also be thought of as a 512×512 switch since each channel can be treated as four OC-48 subchannels. In addition to the port cards, there are up to 16 switching cards (depending on the chosen architecture and organization), which consist of arbiters and crossbars. Each switching card has connections to all the port cards.

All traffic is cellularized, whether TDM or best-effort type traffic. The interface into and out of the switch fabric passes cells over 2.5 Gbps serial links, which include 8B/10B encoding. Each channel of the switch fabric consists of up to ten serial links, providing up to 20 Gbps data rate throughput.

Port cards provide the traffic interface into the switch fabric. Port cards can be architected such that the line interface (optics, Phy.'s, framers), network processing, and traffic management are on the same card, or they can be architected to be on separate cards. A port card's configuration is dependent on the desired chassis architecture and the number of chips needed.

The three basic types of port cards are single channel (10G or OC-192), two channel (20G or 2×OC-192), and four channel (40G or 4×OC-192). The different types of port cards are normally not mixed in the same chassis because the backplane and switch cards would have to be built to support the largest case. When all of the cards are of the same type, there are optimizations that can be done (depending on the required bandwidth), to reduce the number of switch cards or crossbars on those cards, and hence the number of traces on the backplane.

Figure 6:
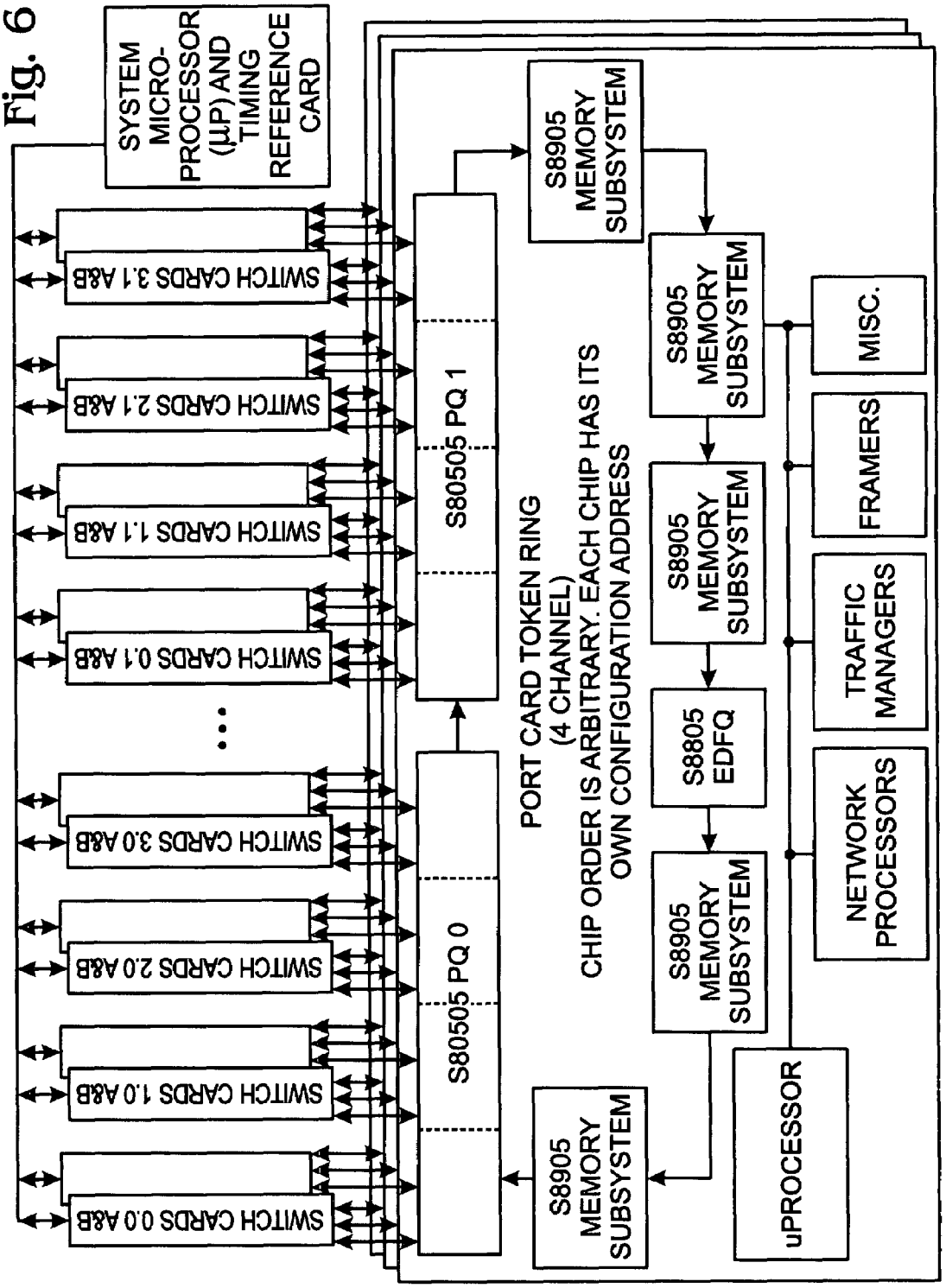
FIG. 6 is a functional diagram of the communication and control paths through a fully populated fabric system.

FIG. 6 is a functional diagram of the communication and control paths through a fully populated fabric system. Note that each switch card, or switching card has a path to all the port cards and that the port card's token bus can be accessed by both the switch cards and the UP on the port card (if it is present).

The switch cards in a system are all connected to a master system processor card or cards which would be responsible for the user interface, interfacing to the switch cards, keeping track of the overall system health, distributing timing to all the cards, and other system functions. Connections between the system card(s) and switch cards are typically Ethernet and provide redundancy (as shown in FIG. 7) so that there is no single point of failure that would prevent communication between all the cards.

Figure 7:
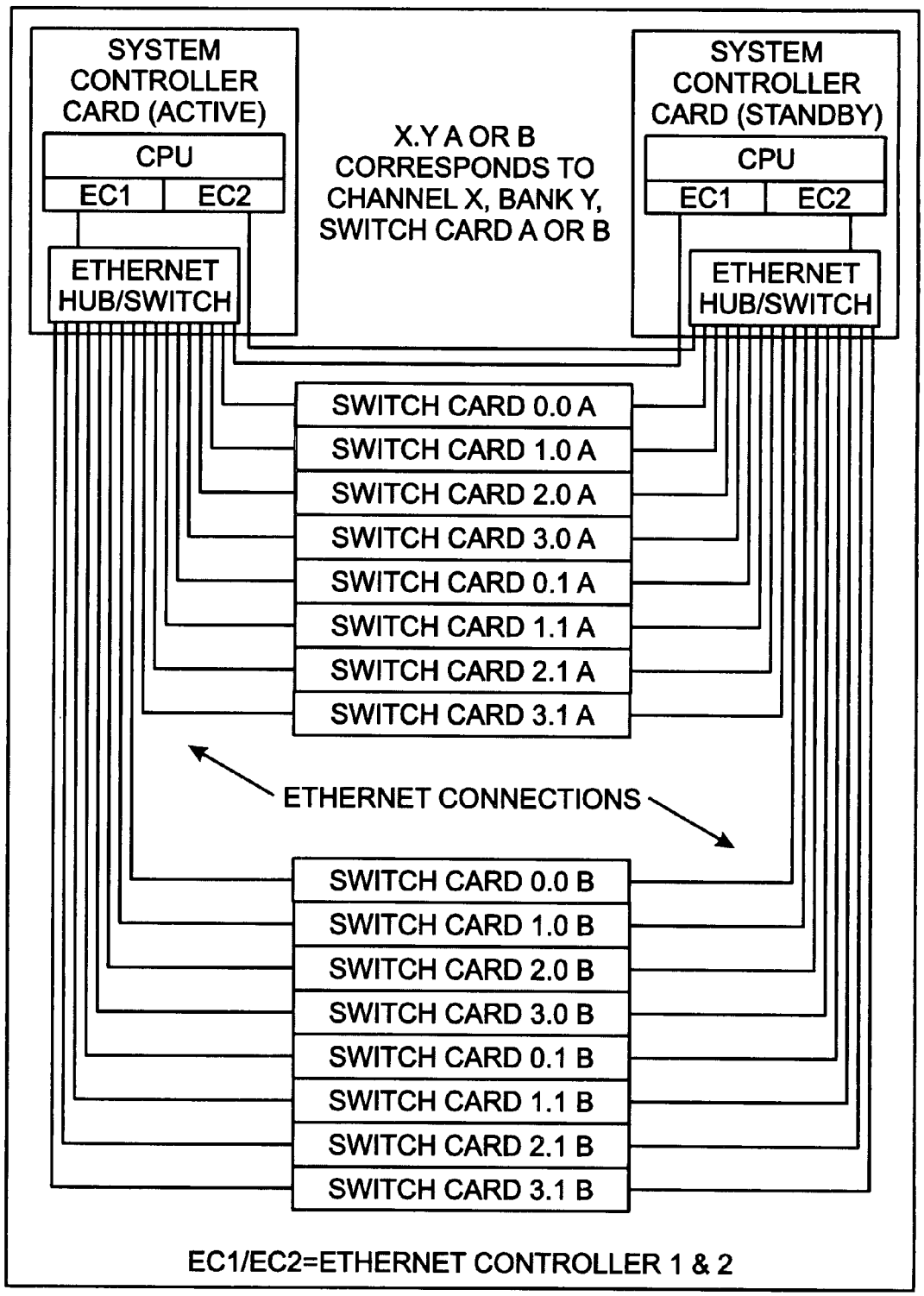
FIG. 7 is a diagram illustrating one of many possible system architectures.

FIG. 7 is a diagram illustrating one of many possible system architectures. In this example, the hub/switch is contained on the system card.

Switch Cards

A processor, or µP located on the switch card is responsible for running the Cyclone firmware. The Cyclone firmware is used to program, monitor and control the Cyclone chips in a Cyclone switch fabric system. Typically a switching subsystem contains multiple, intelligent switch cards that are connected through an internal network in a loosely coupled fashion. The firmware is responsible for configuring the S8605 arbiters, provisioning operational links, monitoring links for failures, recovery from failures, credit based flow control resynchronization, and the configuration and monitoring of port cards. The switch card processor connects directly to the arbiter through the arbiter processor interface.

Figure 8:
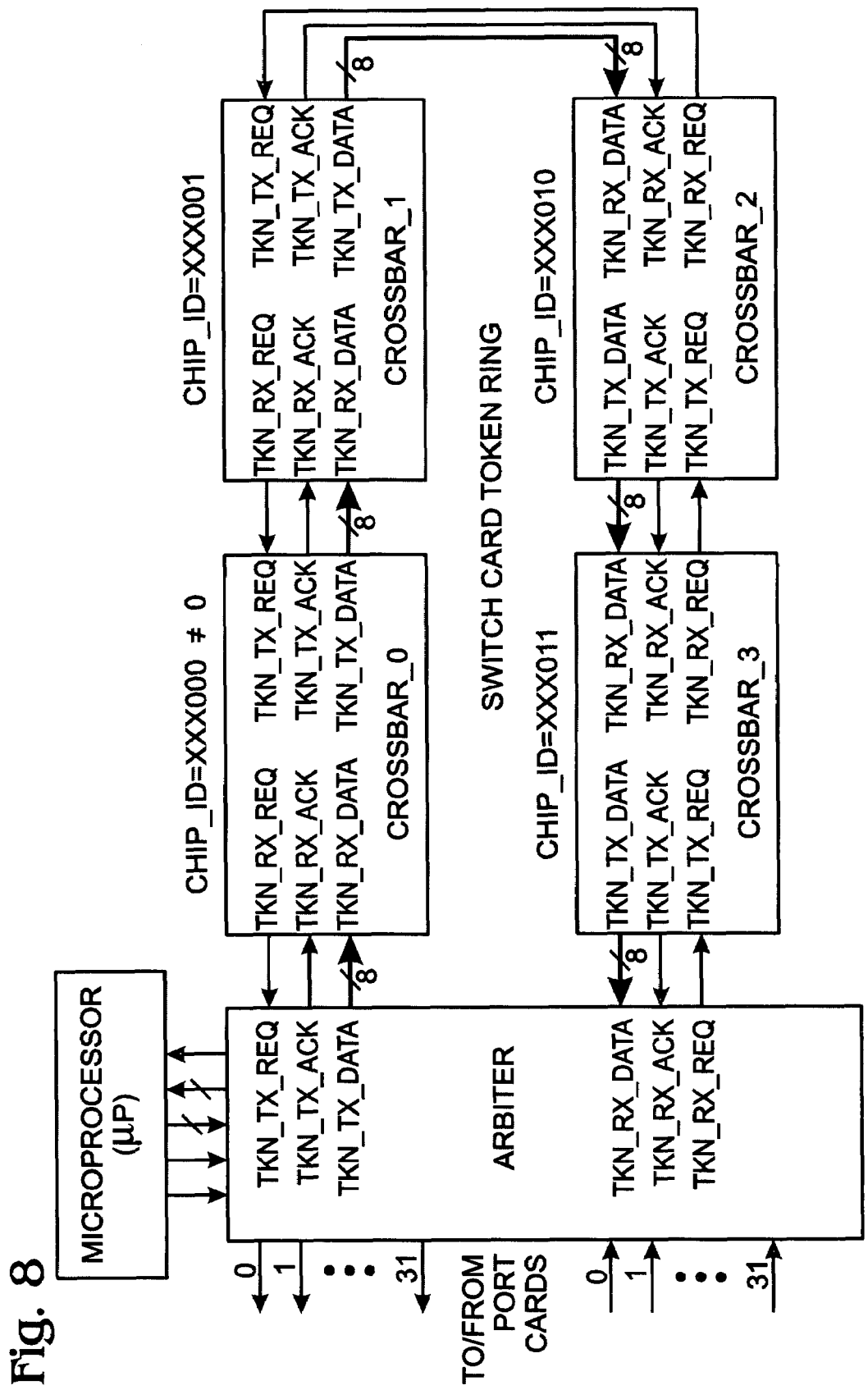
FIG. 8 is a schematic block diagram illustrating an exemplary switch card communication path.

FIG. 8 is a schematic block diagram illustrating an exemplary switch card communication path. The parts of the switch card involved in communication are shown in FIG. 8. The crossbars on a switch card are connected in a token bus configuration with each other and the arbiter. The token bus is used for configuring parameters and monitoring status in the crossbars. The processor on the switch card can access the token buses by through the arbiter.

Figure 9:
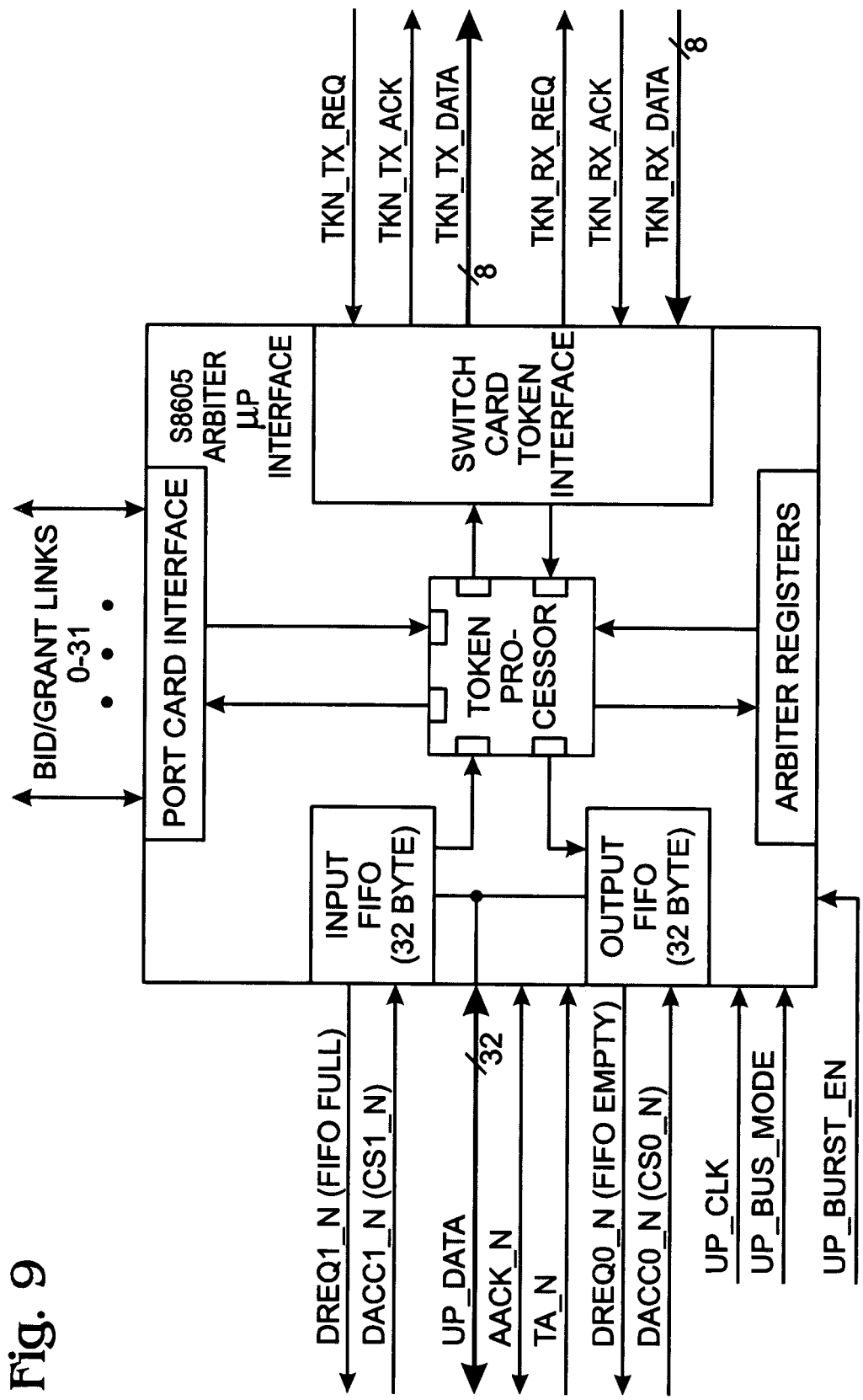
FIG. 9 is a schematic block diagram depicting the arbiter processor interface.

The processor interface on the arbiter is optimized for connecting to the MPC8260 but can be used with a wide variety of processors. The processor interface signals to the arbiter are shown in FIG. 9. The arbiter can be accessed either as a general purpose peripheral on the bus (UP_BUS_MODE='1') or via DMA (UP_BUS_MODE='0'). As a peripheral, the arbiter has two chip selects, one for writing to the input FIFO and another for reading from the output FIFO. The FIFO_FULL signal indicates there is no more room to write more tokens while the FIFO_EMPTY signal indicates that there is nothing left to be read. If the UP_BURST_EN signal is set to '1', then 4 32-bit word transfers are per-formed, i.e. the full and empty flags will be deasserted when four read or write operations can be performed.

FIG. 9 is a schematic block diagram depicting the arbiter processor interface. Using the arbiter in DMA mode requires the use of two DMA channels on the processor. One would be used for writing to the arbiter and the other for reading. Both single address and dual address DMA modes are supported.

The Token Processor inside the arbiter can receive tokens from the processor, the switch card token bus, or from the port cards. At each of the entry and exit points of the Token Processor, there is a small FIFO. It may occur for some reason that the processor output FIFOs are full and there are urgent writes coming from the switch card token bus that have to occur to the arbiter registers in order to shut down grant connections on a certain crossbar's link or links. If there is traffic meant for other sources ahead of that urgent write, it would be blocked by the traffic meant to go to the processor. The arbiter has the "Drop_Tkn_En" (Drop Token Enable) register to deal with this situation. When "Drop_Tkn_En" is enabled, the Token Processor will drop tokens out of its input FIFOs that cannot be sent to their destinations because of an output FIFO backup. In this way, urgent tokens meant for the arbiter registers will be serviced in a timely manner.

Refer to Table 1 for the following discussion of the token format. The processor writes four-byte tokens to the arbiter containing the following information:

1. The port card number that the message is destined for is written into the Link field in bits 4:0 of the first byte. If bit 5, "Switch_Card", is set to '0', the arbiter will send the message out on the link specified in bits 4:0.1f Switch_Card were set to '1', then the Link field would be ignored, and the arbiter will forward the token onto the token bus on this switch card. The "Switch_Card" bit set to "1" indicates to the arbiter that the token is destined for this switch card (the switch card containing this arbiter).

2. The next field that is written is the Destination field. This should correspond to one of the CHIP_IDs on the targeted token bus. None of the CHIP_IDs can be set to zero, which is reserved for flow control packets.

3. The Address and Data fields are written and represent the data and the address that should be written to (or read from) in the targeted chip. If the operation is a read, based on the address, then the Data field is ignored by the destination chip. This information is summarized in Table 1.

TABLE 1

Token Format Written To Arbiter

| Byte | Function | 7 | 6 | 5 | 4 | 3 | 2 | 1 | 0 |
|---|---|---|---|---|---|---|---|---|---|
| 0 | Link | Even Parity | Reserved | Switch Card | Link[4:0] when Switch_Card = '0' Ignored if Switch_Card = '1' | | | | |
| 1 | Dest. | Reserved | | | Destination Chip[5:0] | | | | |
| 2 | Address | Address[7:0] | | | | | | | |
| 3 | Data | Data[7:0] | | | | | | | |

Bit 7 of the Link field is an even parity bit that covers bits 0-5 of the Link and Destination fields, and bits 0-7 of the Address and Data fields (the shaded areas in the table). It is not necessary for the processor to calculate the parity if it is not desired to check the bus between the arbiter and the processor. If the "Upif_Parity_En" (Microprocessor Interface Parity Enable) bit in the arbiter is set to '0', the arbiter will not check the parity and will calculate its own even parity bit for the token before forwarding it to the rest of the system. When set to '1', the arbiter will verify the parity is correct, if it is not, the arbiter will drop the token from the processor, and set "Parity_Err" bit in both the Token Interface Error Register and the High Priority Message Registers.

When a reply comes back from the arbiter, it has the format given in Table 2. The Switch_Card bit indicates whether the communication came from the switch card or one of the port cards. The Link field indicates the link/port number that it came from if the communication came from a port card. The Source field indicates the CHIP_ID of the chip that the communication is coming from. The address and data fields correspond to the address of the register that was read from and the data that was read. Note that a reply does not have to be received before sending out other commands. Packets will usually only come in response to reads with the exception of information coming from the crossbars. Communication may also originate from the port cards, but not spontaneously from one of the chips due to any error conditions. This communication may be started by a port card processor through the MS.

Bit 7 of the Link field in the data going back to the processor is an even parity bit that is calculated by the arbiter and can be used to verify the integrity of the data being read. This bit is calculated over the same bits described previously for the write case (the shaded areas in the table). Whether the parity bit is calculated or not is dependent on the setting of the "Upif_Parity_En" register. If Upif_Parity_En is not set (that is, it is "0"), then bit 7 will be set to "0".

To write to and read from the arbiter's own registers, the same format as described in the above two tables is used. The Switch_Card field would be set to '1' and the Destination or Source field would be the CHIP_ID of the arbiter for a write or read respectively. When the Destination does not match the CHIP_ID of the arbiter or processor, the data would be placed on the token bus. When the processor writes something to a crossbar's register, it would do it the same way as writing to the arbiter's registers except that the Destination field would contain the CHIP_ID of the crossbar. The crossbars' CHIP_IDs need to be set according to which CONFIG_EN from the arbiter they are connected to. As shown in FIG. 8, the least significant three bits of a crossbar's CHIP_ID are set according to the number crossbar it is. The only limitation is that crossbar 0 must not have an all zero CHIP_ID. The format of the data sent on the switch card's token bus is shown in Table 3. The arbiter's processor interface has a CHIP_ID of zero such that a token message originated by it would have a Source Chip field set to zero.

TABLE 2

Token Format Read From Arbiter

| Byte | Function | 7 | 6 | 5 | 4 | 3 | 2 | 1 | 0 |
|---|---|---|---|---|---|---|---|---|---|
| 0 | Link | Even Parity | Reserved | Switch Card | Link[4:0] Ignored if Switch_Card = '1' | | | | |
| 1 | Source | Reserved | | | Source Chip[5:0] | | | | |
| 2 | Address | Address[7:0] | | | | | | | |
| 3 | Data | Data[7:0] | | | | | | | |

TABLE 3

Switch Card Token Bus Data Format

| Byte | Function | 7 | 6 | 5 | 4 | 3 | 2 | 1 | 0 |
|---|---|---|---|---|---|---|---|---|---|
| 0 | Source | Even Parity | Tag | Source Chip[5:0] | | | | | |
| 1 | Dest. | 00 | | Destination Chip[5:0] | | | | | |
| 2 | Address | Address[7:0] | | | | | | | |
| 3 | Data | Data[7:0] | | | | | | | |

Bit 7 of the Source field of the token on the token bus contains even parity and covers bits 0-5 of bytes 0 and 1, and bits 0-7 of bytes 2 and 3 (the shaded area in the table). Parity will be checked if Tkn_Parity_En in the Chip Configuration Registers is set to "1". If the Tkn_Parity_En is not set (that is, Tkn_Parity_En is "0"), then parity will not be checked on incoming token messages, and the chip will place a zero in this bit 7. If any chip finds that the parity does not match, that chip will then drop the token and set "Parity_Err" bit in both the Token Interface Error Register and the High Priority Message Registers.

Bit 6 of the Source field contains the token Tag bit. The token Tag bit is used to prevent tokens with invalid source or destination fields from constantly circulating around the token bus. In order to use the tag feature, the arbiter is configured as the tagger by writing a '1' to its "Tag_Tkn_En" (Tag Token Enable) bit in its chip configuration register. There can be only one tagger on a token bus. The tagger chip will set the this bit to '1' whenever a token is relayed through it. If the tagger chip sees the Tag bit set to '1' on a token that enters it (meaning the token has made a full circuit of the ring), it will proceed to drop that token, and the error is reported by setting bits in the arbiter's High Priority Message and Token Interface Error Registers.

When the packet reaches the device whose CHIP_ID matches the Destination field and the action is a read, the receiving device will swap the Source and Destination fields and place the new data into the Data field. The device will clear the Tag bit. The new packet will then be sent to the next device in the ring and will propagate until it reaches the original source arbiter.

Figure 10:
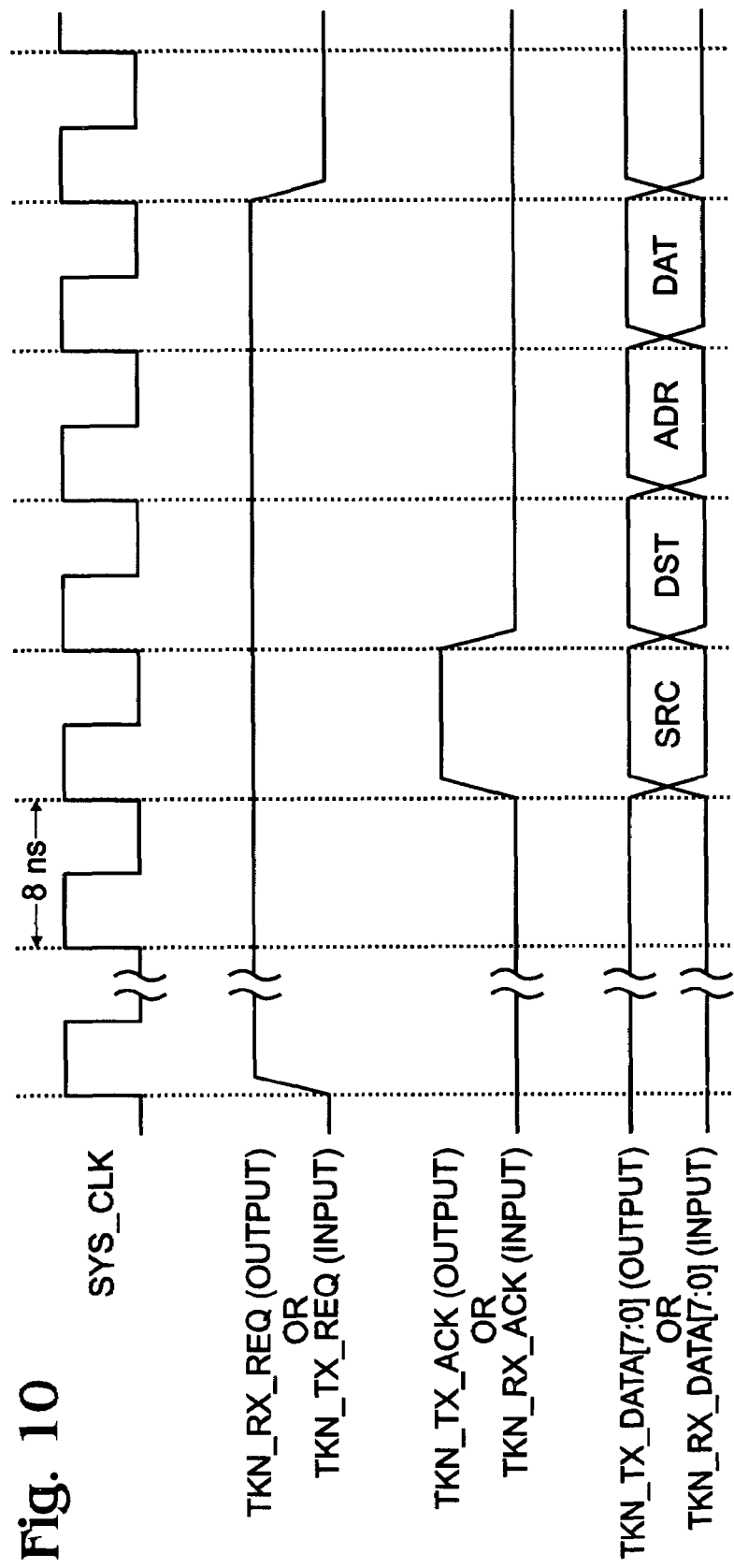
FIG. 10 is a timing diagram associated with a port card token bus.

FIG. 10 is a timing diagram associated with a port card token bus.

Switch Card to Port Card Communication

The arbiters, as shown in FIGS. 6 and 8, have communication connections with all the port cards and their own token buses. An arbiter takes the incoming information from the processor and sends it to the correct port card (based on the Link field) and PQ embedded in a bid acceptance packet. A bid acceptance packet has the format shown in Table 4.

TABLE 4

Data in a Grant Frame (Arbiter to PQ)

| Byte No. | Byte | Description | Enabling Conditions |
|---|---|---|---|
| 0 | 0xBC | [7:0]: DLS (K28.5): Marks the start of a normal grant frame | Normal |
|   | 0x3C | [7:0]: LS0 (K28.1): Clears PQ grant counters if a synchronization adjustment is needed. If an LS0 is sent for resync in a grant frame, then the following grant frame will start with LS0E and contain the actual bid counter offsets. | Resync |
|   | 0xFE | [7:0]: LS0E (K29.7): Gives offsets for PQ bid counters for next rollover. An iPQ on each port card each receives its own offset adjustments (byte, link, and STS) in bytes 5 and 6. | Resync |
| 1 | Grant[0][7:0] | [7:0]: Grants for output ports 7:0 | |
| 2 | Grant[1][7:0] | [7:0]: Grants for output ports 15:8 | |
| 3 | Grant[2][7:0] | [7:0]: Grants for output ports 23:16 | |
| 4 | Grant[3][7:0] | [7:0]: Grants for output ports 31:24 | |
| 5 | "In-Band Data" D0[7:0] | [7:2]: DST[5:0][2] - Token destination chip<br>[1]: SysComm parity[1] (for D0[7:2], D1[7:0], and D2[7:0])<br>[0]: Grant parity[1] (for bytes 1, 2, 3, and 4) | Byte 0 ≠ LS0E |
|   |   | [7:4]: Byte offset, 0 to 15, for resync.<br>[3:2]: Reserved<br>[1]: SysComm parity[1] (for D0[7:2], D1[7:0], and D2[7:0])<br>[0]: Grant parity[1] (for bytes 1, 2, 3, and 4) | Byte 0 = LS0E |
| 6 | "In-Band Data" D1[7:0] | [7:0]: ADR[7:0] - Token address | DST[5:0][2] ≠ 0 |
|   |   | Level 1 XON/XOFF flow control - This byte is an echo of byte 8 of the bid frame. The Arbiter broadcasts this info to all iPQs. All iPQs then stop scheduling packets to the specified Out_Port (byte 7, bits 6:2), Out_Ch, and COS.<br>[7:6]: Control:<br>00 = NOP (mask not valid),<br>01 = Apply COSQ mask to COSQ[3:0], | DST[5:0][2] = 0 |

TABLE 4-continued

Data in a Grant Frame (Arbiter to PQ)

| Byte No. | Byte | Description | Enabling Conditions |
|---|---|---|---|
| | | 10 = Apply COSQ mask to COSQ[7:4], | |
| | | 11 = Apply COSQ mask to COSQ[7:4] and COSQ[3:0] | |
| | | [5:4]: Out_Ch | |
| | | [3:0]: COSQ mask: '0' = XON, '1' = XOFF | |
| | | [7:5]: Link offset, 0 to 4, for resync. | Byte 0 = |
| | | [4:0]: STS offset, 0 to 23, for resync. | LS0E |
| 7 | "In-Band Data" | [7:0]: DAT[7:0] - Token data | DST[5:0]$^2$ ≠ 0 |
| | D2[7:0] | [7]: CBFC_ACKo, for BP_CBFC state change acknowledge, used only in BP_CBFC resync. Sent once, only to the port specified in CBFC_ACKi[5:0] in byte 9 of the bid frame. | DST[5:0]$^2$ = 0 |
| | | [6:2]: COS_XOFF Out_Port (for Level 1 XOFF flow control in byte 6). Sent to all attached iPQs. | |
| | | [1]: TDM_Switch trigger for the next STS rollover. If this Arbiter is the primary Arbiter and the switch command occurs, this bit is activated and set to all attached iPQs. | |
| | | [0]: Reserved | |
| 8-15 | CR0[7:0] thru CR7[7:0] | Credit matrix for credit-based flow control. Matrix format depends on the following switch fabric configuration parameters: Total number of ports in the switch fabric Number of channels per port Number of subchannels per channel | |

[1]Even parity: When the parity bit and the protected field(s) are considered together, there will be an even number of bits equal to '1'.
[2]Note that when the DST[5:0] field is zero, then bytes 6 and 7 are used for flow control.

Bytes 5 through 7 of the bid acceptance packet are used for passing the token packets from the switch card to port card. The information that was written to the arbiter by the processor is simply placed into the bid acceptance packet when a slot is available. Bytes 5 through 7 of the bid acceptance packet are shared by two sources, processor communications and flow control communication. The priority between these two sources is programmable. The first chip to receive any information on the port card from the switch cards is the Priority Queue.

Port Cards

The S8005 series chips on each port card form a token bus as shown in FIG. 6. Entry points into the token bus are provided by the S8505 PQ and the S8905 MS. The MS interface will be discussed later. Each S8505 PQ can receive communications from up to 8 switching cards. The attached switch cards commonly represent two banks of two channels (two channel port card), or four channels depending on the selected port card and backplane organization.

Each chip in the token bus has its own 6-bit CHIP_ID. None of the chips should have its CHIP_ID set as 0 since 0 is used to identify flow control communication between the PQ and arbiter. Each PQ has nine chip IDs. The first, CHIP_ID is the ID for the PQ corresponding to the settings of the CHIP_ID pins. The second, CHIP_ID+1, gives an address to the PQ's Arbiter 0A interface. CHIP_ID+2 gives an address to the PQ's Arbiter 0B interface. This continues to CHIP_ID+8 for the PQ's Arbiter 3B interface. Having an address for each arbiter interface allows the return packet to be sent back to the correct arbiter. There is no required ordering of the chips in the token bus since if a communication packet is not intended for a chip, it is simply passed to the next chip.

A PQ is always the first chip to receive a communication packet from a switch card. If the packet is meant for it, it immediately responds back to the sending arbiter without placing anything on the token bus. If the packet is not meant for it, the PQ will translate the packet into the format shown in Table 5. The Address, Data, and Destination fields are copied directly from the arbiter packet. The "Source Chip" is set to the CHIP_ID of the arbiter interface that the PQ received the communication from. For example, if the PQ received the token from arbiter 1B, "Source Chip" would be set to "3". The switch card processors technically can pass messages to each other via the PQs, since each arbiter has its own implied CHIP_ID. This method of communicating between switch cards is not inefficient. An Ethernet interface may be used for switch card to switch card, and switch card to system card communications.

TABLE 5

Port Card token bus Data Format

| Byte | Function | 7 | 6 | 5 | 4 | 3 | 2 | 1 | 0 |
|---|---|---|---|---|---|---|---|---|---|
| 0 | Source | Even Parity | Tag | Source Chip[5:0] | | | | | |
| 1 | Dest. | 00 | | Destination Chip[5:0] | | | | | |
| 2 | Address | Address[7:0] | | | | | | | |
| 3 | Data | Data[7:0] | | | | | | | |

Bit 7 of the Source field of the token contains even parity and covers bits [5:0] of bytes 0 and 1, and bits [7:0] of bytes 2 and 3 (the shaded area in the table). Bit 6 of the Source field contains the Tag bit. The Tag bit is used to prevent tokens with invalid source or destination fields from constantly circulating around the token bus. In order to use the tag feature, one of the MSs on the port card token bus is configured as a Tagger by writing a '1' to its "Tag_Tkn_En" (Tag Token Enable) bit. The Tagger will set the Tag bit to '1' whenever a token is relayed through it. If the Tagger sees the Tag bit set to '1' on a token that enters it (meaning the token has made a full circuit of the ring), it will proceed to drop that token.

When the packet reaches the device whose CHIP_ID matches the Destination field and the action is a read, the receiving device will swap the Source and Destination fields and place the new data into the Data field. The device will clear the Tag bit. The new packet will then be sent to the next device in the ring and will propagate until it reaches the original source PQ. The functional timing for the token passing is shown in FIG. 10. The communication between chips in the token bus occurs at the SYS_CLK rate with all events occurring on the rising edge.

The downstream chip in the token bus would hold the TKN_TX_REQ (Token Transmit Request) input on the upstream device active to indicate that it can receive a transmission. Once the upstream device has something to transmit, it will pulse its TKN_TX_ACK (Token Transmit Acknowledge) output and simultaneously begin sending the data, beginning with the Source chip ID as shown in FIG. 10. The TKN_TX_REQ remains active as long as the downstream device can receive more tokens. Once deasserted, the TKN_TX_REQ will remain inactive until the downstream device is ready to receive another token.

The MS has a processor hardware interface that is identical to that of the arbiter described previously. The processor-to-MS write and read data formats are shown in Table 6.

Figure 11:
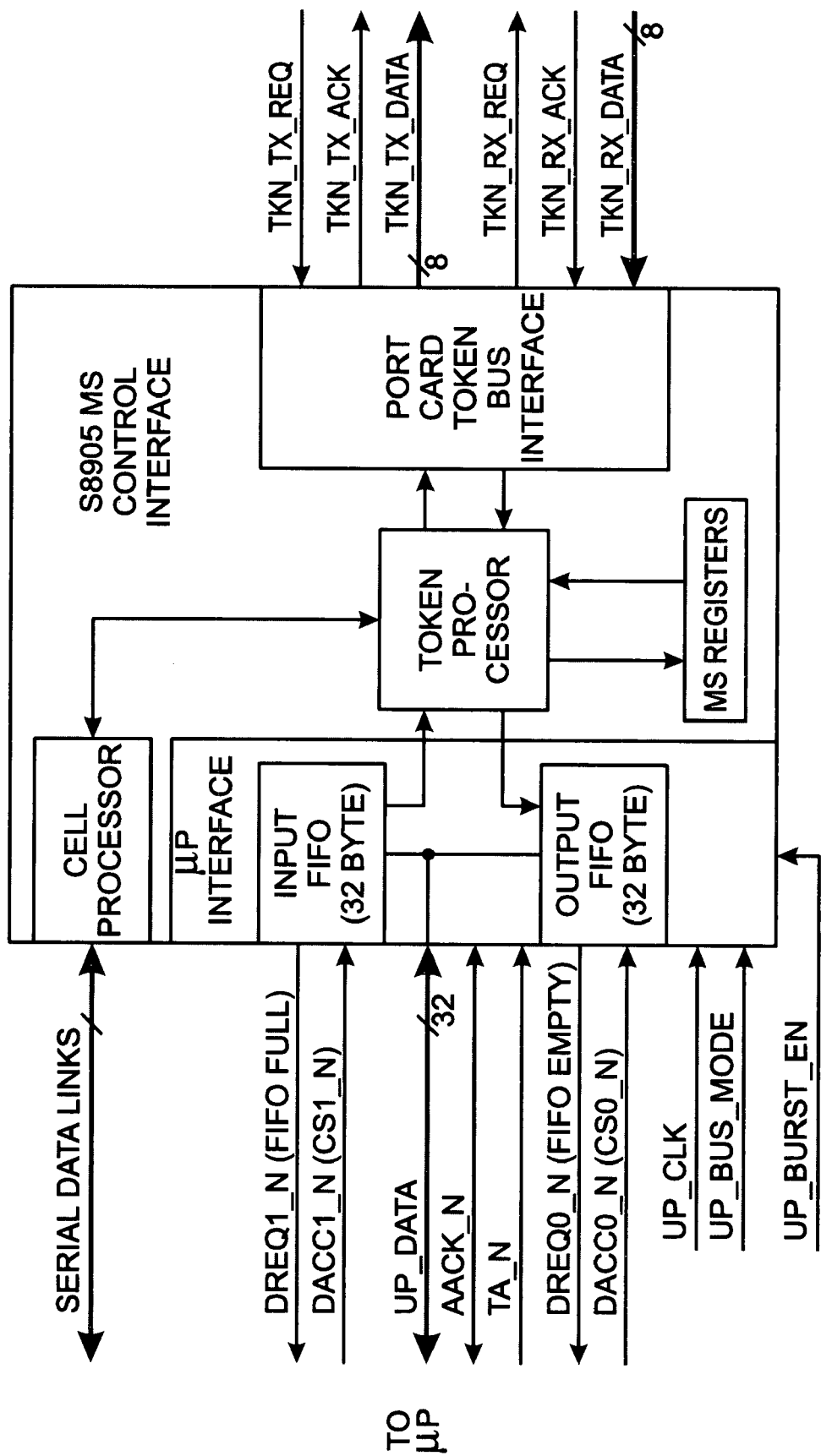
FIG. 11 is a schematic block diagram depicting the MS control interface.

FIG. 11 is a schematic block diagram depicting the MS control interface. The MS can receive information from three possible sources, as shown. Control data can enter via the token bus, the processor interface, or inband in the cell traffic (when using ViX cell format).

Each message source has its own independent FIFOs to avoid any collisions. The message sources have relative priorities. Inband messages passing through the cell processor have the highest priority. Reads from and writes to the MS's registers have the next highest level. The token bus has the third highest priority, followed by the local processor. No matter what the source of a message is, it must have the required fields (Destination, Address, and Data) defined in Table 6 such that it can be sent to the correct destination by the Token Processor. Any point can communicate with any other point through the MS. The local processor can access the traffic manager through the cell processor, the token bus, and the internal registers. The traffic manager can access the processor, the token bus, and internal registers. Through the token bus, communication with the switch card processors is possible.

Figure 12:
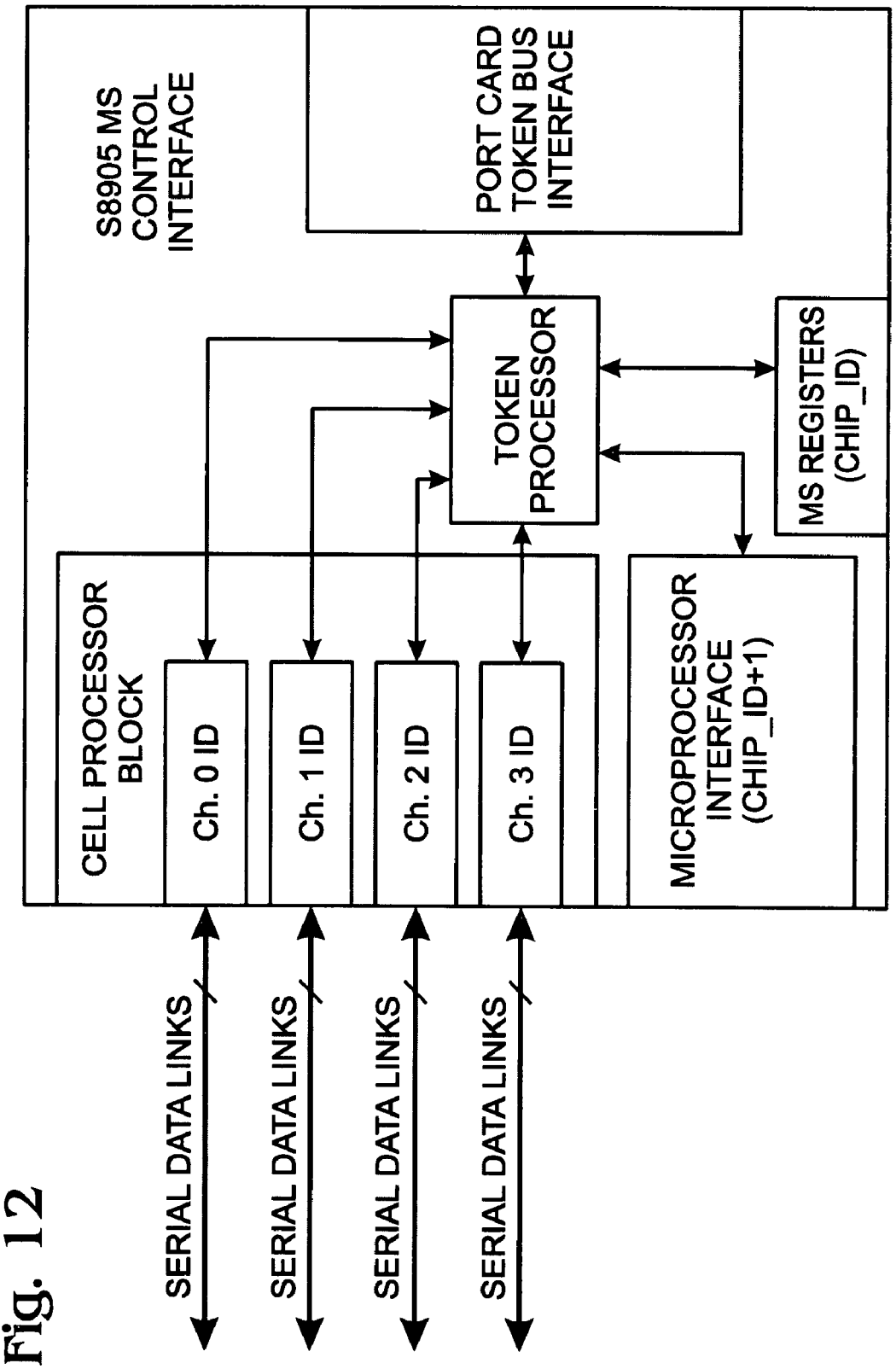
FIG. 12 illustrates the MS IDs.

FIG. 12 illustrates the MS IDs. The MS, similar to the PQ, has several IDs, as shown. If incoming traffic has a destination ID that does not correspond to any of the MS's IDs, the MS will then forward that traffic to the token bus. The ID of the processor interface on the MS is equal to the MS's CHIP_ID+1. The cell processor block has four processor programmable inband ID's, each corresponding to one of the four possible input channels. Inband data can use the MS as a relay point between multiple traffic managers by setting the destination field equal to that of the desired egress channel. The EG_InBandDest in the iMS must be programmed with the same EG_In_BandDest values as the eMS. The iMS will insert this value into the Source Chip field for the corresponding Cell Processor Block Channel ID. If the destination field is equal to the source field for

TABLE 6

Write and Read Data Format for Microprocessor to Memory Subsystem Interface

| Byte | Function | 7 | 6 | 5 | 4 | 3 | 2 | 1 | 0 |
|---|---|---|---|---|---|---|---|---|---|
| 0 | Reserved | Even Parity | Reserved | \multicolumn{6}{c}{Source Chip[5:0] (Set to MS's CHIP_ID[5:0] + 1)} |
| 1 | Dest. | \multicolumn{2}{c}{00} | \multicolumn{6}{c}{Destination Chip[5:0]} |
| 2 | Address | \multicolumn{8}{c}{Address[7:0]} |
| 3 | Data | \multicolumn{8}{c}{Data[7:0]} |

The even parity bit, if enabled by setting the "Upif_Par_En" register bit, covers bits 0-5 of byte 1, and all the bits of bytes 2 and 3 (the shaded area in the table).

For the processor to write to the port card token bus, it would simply provide the information required in Table 6. In order to write to or read from a register in the MS, the Destination field would be set to the MS's CHIP_ID. Data can be sent to a switch card processor by setting the Destination field to the ID of one of the PQ's arbiter interfaces.

inband traffic, that token would then be sent out on the egress side of the channel that originated it.

Port Card to Switch Card Communication

Once a packet destined for leaving the port card arrives at its destination PQ, the contents are placed into a bid packet of the format shown in Table 7 for transmission to the appropriate arbiter. The contents of the token packet are placed one for one into the bid packet (except the Destination Chip field is dropped). The arbiter would receive this information and translate it into the format shown in Table 2 for transmission out the processor interface.

TABLE 7

Data in a Bid Frame (iPQ to Arbiter)

| Byte No. | Byte Contents | Description | Enabling Conditions |
|---|---|---|---|
| 0 | 0xBC | [7:0]: DLS (K28.5): Marks the start of a normal bid frame | Normal |
|   | 0x3C | [7:0]: LS0 (K28.1): Marks (STS0, Link 0, Byte 0) in PQ's bid counters. Sent to all Arbiters. | STS rollover |
| 1 | Bid[0][7:0] | [7:0]: Bids for output ports 7:0 | |
| 2 | Bid[1][7:0] | [7:0]: Bids for output ports 15:8 | |
| 3 | Bid[2][7:0] | [7:0]: Bids for output ports 23:16 | |
| 4 | Bid[3][7:0] | [7:0]: Bids for output ports 31:24 | |
| 5 | Unlock[7:0] | [7:4]: Reserved<br>[3:0]: Unlock[3:0] - 0' = link locked, '1' = link unlocked. Applies to iMS-to-Crossbar links. With a packet in progress, a link is "locked," unavailable for new packets. The unlock belongs to the Crossbar of a bid frame in the bid link cycle. There can be 1, 2, or 4 unlocks in the field Unlock[3:0] depending on the Crossbar format (32×32, 16×16, or 8×8). | |
| 6 | Parity[7:0] | [7:6]: Reserved<br>[5:2]: EPM[3:0] - Egress port mask. Applies to Crossbar-to-eMS link(s). Format similar to Unlock[3:0] for 32×32, 16×16 or 8×8 Crossbar format. Indicates PXOFF or link failure:<br>PXOFF - Based on Q_MS_PXOFF asserted by oPQ or EDFQ, forwarded to iPQ by the eMS, and then broadcast by the iPQ to all attached Arbiters.<br>Failed XBAR-to-eMS link - Based on MS2Q_LINK_FC, from eMS to iPQ. If a crossbar-to-eMS link fails, the iPQ sets one of these bits in the bid link cycle corresponding to the timeslot of the affected crossbar. It is sent to that crossbar's Arbiter only.<br>[1]: SysComm parity[1] (for D0[7:2], D1[7:0], and D2[7:0])<br>[0]: Unlock parity[1] (for U[7:0]) | |
| 7 | "In-Band Data" D0[7:0] | [7:2]: SRC[5:0][2] - Token source chip ID<br>[1:0]: Reserved | |
| 8 | "In-Band Data" D1[7:0] | [7:0]: ADR[7:0] - Token address<br><br>Level 1 XON/XOFF - Whenever there is a change of state in MS2Q_COS_XOFF[9:0], the iPQ will send these 8 bits to one Arbiter, selected by round robin, which will then broadcast the byte to all iPQs in Grant byte 6.<br>[7:6]: Control:<br>00 = NOP (mask not valid),<br>01 = Apply COSQ mask to COSQ[3:0],<br>10 = Apply COSQ mask to COSQ[7:4],<br>11 = Apply COSQ mask to COSQ[7:4] and COSQ[3:0]<br>[5:4]: Out_Ch<br>[3:0]: COSQ mask: '0' = XON, '1' = XOFF | $SRC[5:0]^2 \neq 0$<br><br>$SRC[5:0]^2 = 0$ |
| 9 | "In-Band Data" D2[7:0] | [7:0]: DAT[7:0] - Token data<br><br>[7:2]: CBFC_ACKi[5:0] - BP_CBFC state change acknowledge, used only in BP_CBFC resync. Encoded port # and valid (MSB) are sent to one Arbiter, selected by round robin. This Arbiter will decode CBFC_ACKi[5:0] and set a single bit, CBFC_ACKo, in byte 7 of grant frame to the correct iPQ.<br>[1]: TDM_Switch. Broadcast to all Arbiters when Grant byte 7, bit 1 is set; or when the input Q2Q_TDM_SW (from the other iPQ on a port card with 2 iPQs) is set.<br>[0]: PLE - Permanent link error. Sent only to the affected Arbiter. If set to '1', the Arbiter will stop using this grant link. | $SRC[5:0]^2 \neq 0$<br><br>$SRC[5:0]^2 = 0$ |
| 10-15 | CR0[7:0] thru CR5[7:0] | Credit matrix for credit-based flow control. Matrix format depends on the following switch fabric configuration parameters such as the number of ports, channels, and subchannels | |

[1] Even parity: When the parity bit and the protected field(s) are considered together, there will be an even number of bits equal to '1'.
[2] Note that when the SRC[5:0] field is zero, then bytes 8 and 9 are used for flow control.

Token Bus In-Band Data Bandwidth

The token bus can carry other control data, for example, downloading configuration information to the Cyclone chips on port cards, and returning register data from Cyclone chips on the port cards. Data from switch cards to port cards are carried in the Bid/Accept frames exchanged between the arbiters on the switch cards and PQs on the port cards.

Data is sent to port cards in the "In-Band Data" D2 byte of an Accept frame. Data from port cards is returned in the "In-Band Data" D2 in the Bid frame. This section describes the estimated bandwidth that can be expected to be available for data.

Token Bus Bandwidth Across the Backplane.

The available bandwidth for in-band data between the Arbiter and PQ is approximately 125 Mbps, according to the following formula:

[1 token/Frame between Arb and PQ]*[1 Frame/64 ns]*[8 bits data/token]=125 Mbps.

This is the theoretical maximum in-band data bandwidth across the backplane serial links between an arbiter and a PQ. This assumes that there are no COS collisions or high-priority tokens.

Token Bus Bandwidth Between Cyclone Chips.

Available bandwidth on the token bus between Cyclone chips on a card is given by the following formula:

[1 token/4 cycles]*[1 cycle/8 ns]*[8 bits data/token] =250 Mbps.

Bandwidth Between Microprocessor and μP Interface

The bandwidth that can be expected at the uP interface in DMA and Burst mode and assuming no other activity:

[4 tokens/8 cycles]*[8 bits data/token]*33 MHz=132 Mbps.

(Note: processor bus frequency assumed to be 33 MHz).

The bandwidth across the backplane is the limiting factor, assuming the processor can keep up and that the fabric is not running traffic. In the case where the fabric is running traffic, flow control messages will be time sharing the links between the PQs and arbiters, which will decrease the throughput to an estimated 75 Mbps.

Figure 13A:
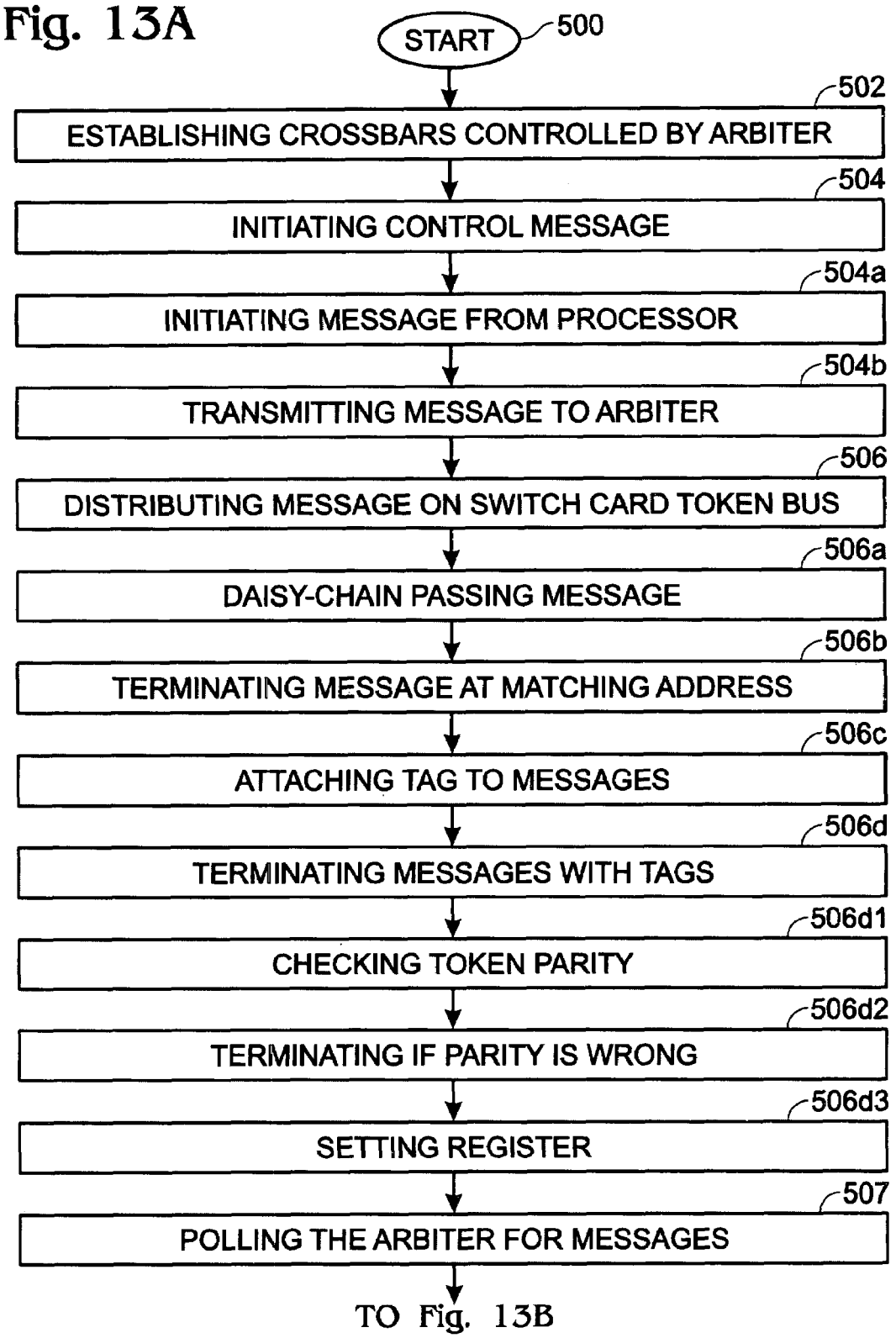

FIGS. 13a and 13b are flowcharts illustrating the present invention method for communicating control information in a switch fabric. Although the method is depicted as a sequence of numbered steps for clarity, no order should be inferred from the numbering unless explicitly stated. It should be understood that some of these steps may be skipped, performed in parallel, or performed without the requirement of maintaining a strict order of sequence. The method starts at Step 500.

Step 502, on a switch card, establishes a plurality of crossbars controlled by an arbiter. Step 504 initiates a control message. Step 506 distributes the control message on a switch card token bus connecting the crossbars and arbiter elements. In some aspects of the method, distributing the control message on a switch card token bus connecting the crossbar and arbiter elements includes daisy-chain connecting the elements with a cyclical bus.

In other aspects, establishing a plurality of crossbars controlled by an arbiter in Step 502 includes identifying each element with a unique address, and initiating a control message in Step 504 includes initiating a control message with an attached address. Then, distributing the control message on a switch card token bus connecting the crossbar and arbiter elements in Step 506 includes substeps. Step 506a daisy-chain passes the control message between elements. Step 506b terminates the message at an element having an address matching the address attached to the control message.

In other aspects, distributing the control message on a switch card token bus connecting the crossbar and arbiter elements in Step 506 includes additional substeps. In Step 506c the arbiter attaches a switch card tag to transmitted messages being distributed on the token bus. Then, in Step 506d the arbiter terminates received messages being distributed on the token bus having switch card tags. In some aspects, Step 506d includes substeps. Step 506c checks the token parity. Step 506d2 terminates the control message if the parity is wrong. Step 506d3 sets a register to indicate that a control message has been terminated in response to a failed parity check.

Some aspects of the method include further steps. Step 508, on a port card, establishes a memory subsystem (MS) controlled by a queuing/scheduling (QS) device, such as a priority queue (PQ), an earliest deadline first queue (EDFQ), or a field programmable gate array (FPGA). Step 510 initiates a control message. Step 512 distributes the control message (see Step 504) on a port card token bus connecting the MS and the QS device elements.

In some aspects, establishing a MS controlled by a QS device on a port card in Step 508 includes establishing an ingress MS (iMS) controlled by an ingress QS (iQS) and an egress MS (eMS) controlled by an egress QS (oQS) device. Then, distributing the control message on a port card token bus connecting the MS and QS device elements in Step 512 includes daisy-chain connecting the iQS, iMS, oQS, and eMS elements with a cyclical bus.

In other aspects, establishing an MS controlled by a QS device in Step 508 includes identifying each element with a unique address. Initiating a control message in Step 510 includes initiating a control message with an attached address. Then, distributing the control message on a port card token bus connecting the MS and QS device elements in Step 512 includes substeps. Step 512a daisy-chain passes the control message between elements. Step 512b terminates the message at an element having an address matching the address attached to the control message.

In some aspects, distributing the control message on a port card token bus connecting the MS and QS device elements in Step 512 includes additional substeps. In Step 512c the MS attaches a port card tag to transmitted messages being distributed on the token bus. In Step 512d the MS terminates received messages being distributed on the token bus having port card tags. In some aspects Step 512d includes substeps. Step 512d1 checks the token parity. Step 512d2 terminates the control message if the parity is wrong. Step 512d3 sets a register to indicate that a control message has been terminated in response to a failed parity check.

Some aspects of the method include a further step, Step 514 of communicating control messages between the switch card arbiter and the port card QS device. In one aspect, Step 514 includes sending a control message from the arbiter to the QS device. Then, distributing the control message on a port card token bus connecting the MS and the QS device in Step 512 includes distributing the message received from the arbiter on the port card token bus.

In other aspects, initiating a control message in Step 504 includes substeps. Step 504a initiates a control message from a switch card processor. Step 504b transmits the control message from the processor to the arbiter. In some aspects, initiating a control message from the switch card processor in Step 504a includes initiating control message such as requests to the arbiter concerning the status of received QS device control links, requests to the crossbars concerning the status of interfacing data links, requests to the QS device concerning the status of the QS device and the status of received arbiter control links, requests to MSs concerning MS status and the status of received data links, switch card configuration commands, and port card configuration commands.

In one aspect, initiating a control message in Step 504 includes a crossbar initiating a control message in response to backplane data link interface fault. Then, distributing the control message on a switch card token bus connecting the crossbars and arbiter elements in Step 506 includes passing the control message from the crossbar to the arbiter. Then, the method comprises a further step, Step 507. Step 507 includes a switch card processor polling the arbiter to collect the control message.

In other aspects, communicating control messages between the switch card arbiter and the port card QS device in Step 514 includes sending a control message from the QS device to the arbiter.

In some aspects, communicating control messages between the switch card arbiter and the port card QS device in Step 514 includes communicating control messages between a plurality of switch cards and a plurality of port cards. In other aspects, Step 514 includes communicating control messages from a first switch card to a second switch card, through an intervening port card.

A system and method has been provided for communicating control information in a switch fabric using port card and switch card token buses, and control links between the switch cards and port cards. Some specific exampled have been given of the types of control communications that be established using the present invention token bus. However, it should be understood that the present invention is not limited to just these examples. Other variations and embodiments of the inventions will occur to those skilled in the art.

We claim:

1. A method for communicating control information in a switch fabric, the method comprising:
   on a switch card, establishing a plurality of crossbars controlled by an arbiter and identifying each element with a unique address;
   initiating a control message with an attached address;
   distributing the control message on a switch card token bus daisy-chain connecting the crossbars and arbiter elements with a cyclic bus as follows:
   daisy-chain Passing the control message between elements; and,
   terminating the message at an element having an address matching the address attached to the control message.

2. The method of claim 1 wherein distributing the control message on a switch card token bus connecting the crossbar and arbiter elements includes the arbiter attaching a switch card tag to transmitted messages being distributed on the token bus.

3. The method of claim 2 wherein distributing the control message on a switch card token bus connecting the crossbar and arbiter elements includes the arbiter terminating received messages being distributed on the token bus having switch card tags.

4. The method of claim 3 wherein the arbiter terminating received messages being distributed on the token bus having switch card tags includes:
   checking the token parity;
   terminating the control message if the parity is wrong; and,
   setting a register to indicate that a control message has been terminated in response to a failed parity check.

5. The method of claim 3 further comprising:
   on a port card, establishing a memory subsystem (MS) controlled by a queuing/scheduling (QS) device selected from the group including a priority queue (PQ), an earliest deadline first queue (EDFQ), and a field programmable gate array (FPGA); and,
   distributing the control message on a port card token bus connecting the MS and the QS device elements.

6. The method of claim 5 wherein establishing a MS controlled by a QS device on a port card includes establishing an ingress MS (iMS) controlled by an ingress QS (iQS) and an egress MS (eMS) controlled by an egress QS (oQS) device; and,
   wherein distributing the control message on a port card token bus connecting the MS and QS device elements includes daisy-chain connecting the iQS, iMS, oQS, and eMS elements with a cyclical bus.

7. The method of claim 6 wherein establishing an MS controlled by a QS device includes identifying each element with a unique address; and,
   wherein initiating a control message includes initiating a control message with an attached address; and,
   wherein distributing the control message on a port card token bus connecting the MS and QS device elements includes:
   daisy-chain passing the control message between elements; and,
   terminating the message at an element having an address matching the address attached to the control message.

8. The method of claim 7 wherein distributing the control message on a port card token bus connecting the MS and QS device elements includes the MS attaching a port card tag to transmitted messages being distributed on the token bus.

9. The method of claim 8 wherein distributing the control message on a port card token bus connecting the MS and QS device elements includes the MS terminating received messages being distributed on the token bus having port card tags.

10. The method of claim 9 wherein the MS terminating received messages being distributed on the token bus having port card tags includes:
    checking the token parity;
    terminating the control message if the parity is wrong; and,
    setting a register to indicate that a control message has been terminated in response to a failed parity check.

11. The method of claim 9 further comprising:
    communicating control messages between the switch card arbiter and the port card QS device.

12. The method of claim 11 wherein communicating control messages between the switch card arbiter and the port card QS device includes sending a control message from the arbiter to the QS device; and,
    wherein distributing the control message on a port card token bus connecting the MS and the QS device includes distributing the message received from the arbiter on the port card token bus.

13. The method of claim 1 wherein initiating a control message includes:
    initiating a control message from a switch card processor; and,
    transmitting the control message from the processor to the arbiter.

14. The method of claim 13 wherein initiating a control message from the switch card processor includes initiating a control message selected from the group including requests to the arbiter concerning the status of received QS device control links, requests to the crossbars concerning the status of interfacing data links, requests to the QS device concerning QS device status and the status of received arbiter control links, requests to MSs concerning MS status and the status of received data links, switch card configuration commands, and port card configuration commands.

15. The method of claim 1 wherein initiating a control message includes a crossbar initiating a control message in response to data link interface fault;
    wherein distributing the control message on a switch card token bus connecting the crossbars and arbiter elements includes passing the control message from the crossbar to the arbiter; and,
    the method further comprising:
    a switch card processor polling the arbiter to collect the control message.

16. The method of claim 11 wherein communicating control messages between the switch card arbiter and the port card QS device includes sending a control message from the QS device to the arbiter.

17. The method of claim 11 wherein communicating control messages between the switch card arbiter and the port card QS device includes communicating control messages between a plurality of switch cards and a plurality of port cards.

18. The method of claim 17 wherein communicating control messages between the switch card arbiter and the port card QS device includes communicating control messages from a first switch card to a second switch card, through an intervening port card.

19. A system for communicating control information in a switch fabric, the system comprising:
a switch card including:
a plurality of crossbars, each crossbar having an ingress and egress control port, and a plurality of backplane data link interfaces;
an arbiter having an ingress and egress control port; and,
a switch card token cyclical bus daisy-chain connecting the arbiter and crossbar element control ingress and egress ports for the distribution of control messages.

20. The system of claim 19 wherein the switch card token bus daisy-chain passes a control message, with an address attachment, between the arbiter and the crossbar elements;
wherein the arbiter has a unique address, the arbiter reading and terminating any received control message with an attachment matching the arbiter address; and,
wherein each crossbar has a unique address, each crossbar reading and terminating a received control message with an attachment matching its address.

21. The system of claim 20 wherein the arbiter attaches a switch card tag to messages being transmitted on the token bus.

22. The system of claim 21 wherein the arbiter terminates messages being received on the token bus having switch card tags.

23. The system of claim 22 wherein the arbiter includes a register, the arbiter checking the token parity of the received control message, terminating the control message if the parity is wrong, and setting the register to indicate that a control message has been terminated in response to a failed parity check.

24. The system of claim 22 further comprising:
a port card including:
a queuing and scheduling (QS) device selected from the group including a priority queue (PQ), an earliest deadline first queue (EDFQ), and a field programmable gate array (FPGA), having an ingress and egress control port;
a memory subsystem (MS) having an ingress and egress control port, backplane data link interfaces connected to the switch card crossbar backplane data link interfaces, and data link interfaces connected to port card ingress/egress ports; and,
a port card token bus connecting the MS and the QS device control ports for the distribution of control messages.

25. The system of claim 24 wherein the MS includes an ingress MS (iMS) and egress MS (eMS) with ingress and egress control ports;
wherein the QS device includes an ingress QS (iQS) device, for controlling the iMS, and an egress QS (oQS) device, for controlling the eMS;
wherein the port card token bus daisy-chain connects the iQS device, iMs, oQS device, and eMS element ingress and egress control ports with a cyclical bus.

26. The system of claim 24 wherein the port card token bus daisy-chain passes a control message with an address attachment between the QS device and the MS element;
wherein the MS has a unique address, the MS reading and terminating any received control message with an attachment matching the MS address; and,
wherein the QS device has a unique address, the QS device reading and terminating a received control message with an attachment matching the queuing device address.

27. The system of claim 26 wherein the MS attaches a port card tag to transmitted messages being distributed on the token bus.

28. The system of claim 27 wherein the MS terminates received messages being distributed on the bus having port card tags.

29. The system of claim 28 wherein the MS includes a register, the MS checking the token parity of the received control message, terminating the control message if the parity is wrong, and setting the register to indicate that a control message has been terminated in response to a failed parity check.

30. The system of claim 28 wherein the switch card arbiter has a control link port connected to the port card QS device, for communicating control messages.

31. The system of claim 30 wherein the arbiter sends a control message to the QS device;
wherein the QS device passes the control message to the port card token bus; and,
wherein the port card token bus distributes the control message from the arbiter.

32. The system of claim 19 wherein the arbiter includes a processor port; and,
wherein the switch card further includes:
a processor having a port connected to the arbiter processor port for initiating control messages.

33. The system of claim 32 wherein the processor initiates a control message selected from the group including requests to the arbiter concerning the status of received QS device control links, requests to the crossbars concerning the status of interfacing data links, requests to the QS device concerning the status of the QS device and the status of received arbiter control links, requests to MSs concerning MS status and the status of received data links, switch card configuration commands, and port card configuration commands.

34. The system of claim 23 wherein a crossbar initiates a control message in response to backplane data link faults;
wherein the switch card token bus passes the control message from the crossbar to the arbiter;
wherein the arbiter accepts and saves the control message, and wherein the arbiter has a processor port; and,
wherein the switch card further includes:
a processor having a port connected to the arbiter processor, the processor polling the arbiter for saved control messages.

35. The system of claim 30 wherein the port card QS device sends a control message to the switch card arbiter.

36. The system of claim 30 further comprising:
a plurality of port cards, each port card including:
a QS device selected from the group including a PQ, an EDFQ, and a FPGA, having a control port connected to a switch card arbiter;
a MS having a control port and a plurality of backplane data link interfaces connected to the switch card crossbar backplane data link interfaces; and,
a port card token bus connecting the MS and the QS device elements for the distribution of control messages.

37. The system of claim 36 further comprising:
a plurality of switch cards, each switch card including:
a plurality of crossbars, each crossbar having a control port and a plurality of backplane data link interfaces;
an arbiter having a control port connected to a plurality of port card QS devices; and, a switch card token bus connecting the arbiter and crossbar element control ports for the distribution of control messages.

38. A method for communicating control information in a switch fabric, the method comprising:

on a switch card, establishing a plurality of crossbars controlled by an arbiter;

initiating a control message as follows:

initiating a control message from a switch card processor, the control message selected from a group including requests to the arbiter concerning the status of received QS device control links, requests to the crossbars concerning the status of interfacing data links, requests to the QS device concerning QS device status and the status of received arbiter control links, requests to MSs concerning MS status and the status of received data links, switch card configuration commands, and port card configuration commands; and, transmitting the control message from the processor to the arbiter; and, distributing the control message on a switch card token bus connecting the crossbars and arbiter elements.

39. A method for communicating control information in a switch fabric, the method comprising:

on a switch card, establishing a plurality of crossbars controlled by an arbiter;

a crossbar initiating a control message in response to data link interface fault;

distributing the control message on a switch card token bus connecting the crossbars and arbiter elements by passing the control message from the crossbar to the arbiter; and, a switch card processor polling the arbiter to collect the control message.

40. A system for communicating control information in a switch fabric, the system comprising:

a switch card including:

a plurality of crossbars, each crossbar having an ingress and egress control port, and a plurality of backplane data link interfaces;

an arbiter having an ingress and egress control port, and a processor port;

a switch card token bus connecting the arbiter and crossbar element control ports for the distribution of control messages; and, a processor having a port connected to the arbiter processor port for initiating control messages selected from a group including requests to the arbiter concerning the status of received QS device control links, requests to the crossbars concerning the status of interfacing data links, requests to the QS device concerning the status of the QS device and the status of received arbiter control links, requests to MSs concerning MS status and the status of received data links, switch card configuration commands, and port card configuration commands.

* * * * *